United States Patent
Zhang et al.

(10) Patent No.: US 12,175,168 B2
(45) Date of Patent: Dec. 24, 2024

(54) POWER SUPPLY NETWORK DESIGN METHOD AND APPARATUS, AND STORAGE MEDIUM

(71) Applicant: GREE ELECTRIC APPLIANCES, INC. OF ZHUHAI, Qianshan Zhuhai (CN)

(72) Inventors: Xinran Zhang, Zhuhai (CN); Zhensheng Liu, Zhuhai (CN); Gengmin Li, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 850 days.

(21) Appl. No.: 17/419,232

(22) PCT Filed: Sep. 29, 2019

(86) PCT No.: PCT/CN2019/109190
§ 371 (c)(1),
(2) Date: Jun. 28, 2021

(87) PCT Pub. No.: WO2020/140517
PCT Pub. Date: Jul. 9, 2020

(65) Prior Publication Data
US 2022/0058308 A1   Feb. 24, 2022

(30) Foreign Application Priority Data

Jan. 2, 2019   (CN) .......................... 201910002719.1

(51) Int. Cl.
*G06F 30/18*   (2020.01)
*G06F 17/18*   (2006.01)
(Continued)

(52) U.S. Cl.
CPC .............. *G06F 30/18* (2020.01); *G06F 17/18* (2013.01); *G06F 30/39* (2020.01); *G06F 2111/10* (2020.01); *G06F 2113/04* (2020.01)

(58) Field of Classification Search
CPC .......... G06F 30/18; G06F 30/39; G06F 17/18; G06F 2113/04; G06F 2111/10
(Continued)

(56) References Cited

U.S. PATENT DOCUMENTS

| | | |
|---|---|---|
| 5,808,900 A | 9/1998 | Buer et al. |
| 7,219,324 B1 | 5/2007 | Sherlekar et al. |

(Continued)

FOREIGN PATENT DOCUMENTS

| | | |
|---|---|---|
| CN | 1917206 A | 2/2007 |
| CN | 101908080 A | 12/2010 |

(Continued)

OTHER PUBLICATIONS

International Search Report mailed Dec. 27, 2019, issued in International Application No. PCT/CN2019/109190, filed Sep. 29, 2019, 2 pages.

*Primary Examiner* — Suresh Memula
(74) *Attorney, Agent, or Firm* — Christensen O'Connor Johnson Kindness PLLC

(57) ABSTRACT

Disclosed are a power supply network design method and apparatus, and a storage medium. The method includes: identifying a coordinate of each memory macro cell in a power domain to be processed; determining a coordinate of a first area, a coordinate of each second area, and a coordinate of each third area according to the coordinate of the each memory macro cell; determining a first metal wire arrangement parameter in the first area according to a design requirement, determining a second metal wire arrangement parameter in each second area according to the coordinate of (Continued)

each second area, determining a third metal wire arrangement parameter in each third area according to the coordinate of each third area; performing a power supply network arrangement on the first area, each second area, and each third area according to the coordinate of the first area, the coordinate of each second area, the coordinate of each third area, and the corresponding first metal wire arrangement parameter, second metal wire arrangement parameter, and third metal wire arrangement parameter.

20 Claims, 9 Drawing Sheets

(51) Int. Cl.
  *G06F 30/39* (2020.01)
  *G06F 111/10* (2020.01)
  *G06F 113/04* (2020.01)
(58) Field of Classification Search
  USPC .......................................................... 716/120
  See application file for complete search history.

(56) References Cited

U.S. PATENT DOCUMENTS

| | | | | | |
|---|---|---|---|---|---|
| 8,601,423 | B1* | 12/2013 | Philip | ................. | G06F 15/7825 |
| | | | | | 716/121 |
| 11,625,523 | B2* | 4/2023 | Lin | ..................... | G11C 7/1012 |
| | | | | | 716/116 |
| 11,669,671 | B2* | 6/2023 | Biswas | ................... | G06F 30/39 |
| | | | | | 716/119 |
| 11,675,951 | B2* | 6/2023 | Ghose | ..................... | G06N 3/08 |
| | | | | | 716/100 |
| 11,704,464 | B2* | 7/2023 | Peng | ................... | H01L 27/0207 |
| | | | | | 716/119 |
| 11,783,104 | B2* | 10/2023 | Yu | ......................... | G06F 30/323 |
| | | | | | 716/100 |
| 2002/0010901 | A1* | 1/2002 | Otaguro | ................ | G06F 30/367 |
| | | | | | 716/104 |
| 2003/0212975 | A1* | 11/2003 | Frerichs | .................. | G06F 30/30 |
| | | | | | 716/114 |
| 2004/0060029 | A1* | 3/2004 | Andreev | ................. | G06F 30/39 |
| | | | | | 716/114 |
| 2005/0028124 | A1 | 2/2005 | Gedamu et al. | | |
| 2006/0026545 | A1* | 2/2006 | Allen | .................... | G06F 30/392 |
| | | | | | 716/122 |
| 2009/0307640 | A1* | 12/2009 | Chapman | ............ | G06F 30/3323 |
| | | | | | 716/136 |
| 2010/0077374 | A1* | 3/2010 | Qiu | ....................... | G06F 30/394 |
| | | | | | 716/116 |
| 2015/0186561 | A1* | 7/2015 | Teig | ..................... | G06F 30/398 |
| | | | | | 716/134 |

FOREIGN PATENT DOCUMENTS

| | | |
|---|---|---|
| CN | 106844809 A | 6/2017 |
| CN | 106855893 A | 6/2017 |

* cited by examiner

POWER SUPPLY NETWORK DESIGN METHOD AND APPARATUS, AND STORAGE MEDIUM

CROSS REFERENCE TO RELATED APPLICATION

The present application claims priority to Chinese Patent Application with No. 201910002719.1, entitled "Power Supply Network Design Method and Apparatus, and Storage Medium", and filed on Jan. 2, 2019, the content of which is expressly incorporated herein by reference in its entirety.

TECHNICAL FIELD

The present disclosure relates to the field of chip design, and particularly to a power supply network design method and apparatus, and a storage medium.

BACKGROUND

In the chip design, the design of the power supply network is very important, which is related to the stability of the chip's work. The design of the power supply network directly affects the operating speed and functional stability of the chip. If there are power supply weaknesses in some parts of the power supply network, the circuit devices in the problem area have a large voltage drop, which may eventually cause the circuit to function abnormally. The chip multi-power domain design means that the chip is powered by multiple power supplies or has several power supplies separated internally. There are complex design methods: MTCMOS Power Gating, Power Gating with State Retention, Dynamic Voltage and Frequency Scaling, Low-Vdd Standby and so on.

In large-scale chip design, the chip contains a large number of memory macro cells. If the power gating technology is superimposed, high requirements are made on the power supply of the memory macro cells. In order to ensure the normal operations of a large number of memory macro cells, the power demands of these memories and instant power supply capacities of switching on and off are definitely considered in the design of the power supply network. In the design of a power supply network with multiple power domains, the design requirements of the above technologies need to be satisfied, and the strength of the power supply network needs to be guaranteed without local weaknesses. Faced with the complex design requirements, the division of the power supply network and the determination of related parameters require engineers to calculate, which is time consuming and has a high error rate. It is necessary to find an automatic method for design of a power supply network with multiple power domains, to reduce the design difficulty and error points and enhance the quality of the power supply network.

SUMMARY

The main purpose of the disclosure is to overcome the above-mentioned defects in the related art, and provide a power network design method, apparatus, and storage medium to solve the problem of realizing the automation of design of a power supply network with multiple power domains in the related art.

In one aspect of the present disclosure, a power supply network design method is provided, including: identifying a coordinate of each memory macro cell in a power domain to be processed, the memory macro cell being rectangular, the coordinate including plane coordinates of four corners of the memory macro cell; determining a coordinate of a first area, a coordinate of each second area, and a coordinate of each third area in the power domain to be processed according to the coordinate of the each memory macro cell in the power domain to be processed, wherein the second area includes an area between adjacent memory macro cells, the third area includes an area of each independent memory macro cell, and the first area includes an area excluding the first area and the second area; determining a first metal wire arrangement parameter in the first area in the power domain to be processed according to a design requirement, and determining a corresponding second metal wire arrangement parameter in each second area according to the coordinate of the each second area, and determining a corresponding third metal wire arrangement parameter in the each third area according to the coordinate of the each third area; respectively performing a power supply network arrangement on the first area, the each second area, and the each third area of the power domain to be processed according to the determined first metal wire arrangement parameter, the determined second metal wire arrangement parameter, and the determined third metal wire arrangement parameter.

Optionally, the determining the coordinate of each second area in the power domain to be processed according to the coordinate of each memory macro cell in the power domain to be processed includes: serving every two memory macro cells with consecutive serial numbers and a second area therebetween among various memory macro cells as an analysis unit according to a serial number of each memory macro cell in the power domain to be processed; determining a coordinate of the second area between the two memory macro cells with the consecutive serial numbers according to coordinates of the two memory macro cells with the consecutive serial numbers in each analysis unit.

Optionally, the determining the coordinate of the second area between the two memory macro cells with the consecutive serial numbers according to the coordinates of the two memory macro cells with the consecutive serial numbers in each analysis unit includes: serving a right upper vertex coordinate and a right lower vertex coordinate of a memory macro cell of a former serial number in the two memory macro cells with the consecutive serial numbers in each analysis unit respectively as a left upper vertex coordinate and a left lower vertex coordinate of the second area between the two memory macro cells with the consecutive serial numbers; serving a left upper vertex coordinate and a left lower vertex coordinate of a memory macro cell of a later serial number in the two memory macro cells with the consecutive serial numbers in each analysis unit respectively as a right upper vertex coordinate and a right lower vertex coordinate of the second area between the two memory macro cells with the consecutive serial numbers; serving a second vertex coordinate and a fourth vertex coordinate of the memory macro cell of the former serial number in the two memory macro cells with the consecutive serial numbers in each analysis unit respectively as a first vertex coordinate and a third vertex coordinate of the second area between the two memory macro cells with the consecutive serial numbers; serving a first vertex coordinate and a third vertex coordinate of the memory macro cell of the later serial number in the two memory macro cells with the consecutive serial numbers in each analysis unit respectively as a second vertex coordinate and a fourth vertex coordinate of the second area between the two memory macro cells with the consecutive serial numbers.

Optionally, the method further includes: before determining the coordinate of the second area between the two memory macro cells with the consecutive serial numbers according to the coordinates of the two memory macro cells with the consecutive serial numbers in each analysis unit, determining whether the second area exists between the two memory macro cells with the consecutive serial numbers in each analysis unit.

Optionally, the determining whether the second area exists between the two memory macro cells with the consecutive serial numbers in each analysis unit includes: determining whether a difference value between an abscissa of the first vertex coordinate/the third vertex coordinate of the memory macro cell of the later serial number in the two memory macro cells with the consecutive serial numbers and an abscissa of the second vertex coordinate or the fourth vertex coordinate of the memory macro cell of the former serial number in the two memory macro cells with the consecutive serial numbers is greater than zero; determining that the second area exists between the two memory macro cells with the consecutive serial numbers when the difference value between the abscissa of the first vertex coordinate/the third vertex coordinate of the memory macro cell of the later serial number in the two memory macro cells with the consecutive serial numbers and the abscissa of the second vertex coordinate or the fourth vertex coordinate of the memory macro cell of the former serial number in the two memory macro cells with the consecutive serial numbers is greater than zero.

Optionally, at least one of the first metal wire arrangement parameter, the second metal wire arrangement parameter, and the third metal wire arrangement parameter includes: a first distance parameter, configured to be a distance O between a middle position of a first metal wire on a first side and a first side edge of an area, wherein the first metal wire is in a first group of metal wires on the first side of the area; a second distance parameter, configured to be a distance S between two adjacent metal wires in each group of metal wires; a third distance parameter, configured to be a distance P between two first metal wires respectively on two first sides of two adjacent groups of metal wires; a width parameter, configured to be a width W of each metal wire in each group of metal wires.

Optionally, the determining the first metal wire arrangement parameter in the first area of the power domain to be processed according to the design requirement includes: determining a width parameter $W_1$ and a second distance parameter $S_1$ of each first area according to the design requirement; in accordance with a first preset regulation, determining a first distance parameter $O_1$ of each first area according to the width parameter $W_1$ and a first preset adjustment parameter factor $k_1$ of each first area; in accordance with a second preset regulation, determining a third distance parameter $P_1$ of each first area according to the width parameter $W_1$ and the second distance parameter $S_1$ of each first area; wherein the first preset regulation includes $O_1=W_1/2+k_1$; the second preset regulation includes: $P_1=i(W_1-S_1)$; wherein $W_1$ is the width parameter of each first area, $S_1$ is the second distance parameter of each first area, $P_1$ is the third distance parameter of each first area, and i is a number of metal wires in each group; and/or, the determining the corresponding second metal wire arrangement parameter in each second area according to the coordinate of each second area includes: determining a width parameter $W_2$ of each second area according to the design requirement; in accordance with a third preset regulation, determining a first distance parameter $O_2$ of each second area according to the width parameter $W_2$; wherein the third preset regulation includes $O_2=W_2/2$; determining the second distance parameter $S_2$ and the third distance parameter $P_2$ of each second area according to the coordinate of each second area by using following formulas:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

wherein $W_2$ is the width parameter of each second area, $S_2$ is the second distance parameter of each second area, $P_2$ is the third distance parameter of each second area, i is the number of metal wires in each group, $(X_{n+1})$ is an abscissa of a second or fourth vertex coordinate of each second area, $(X_n+W_{Mn})$ is an abscissa of a first or third vertex coordinate of each second area, n is the serial number of the memory macro cell;

and/or, the determining the corresponding third metal wire arrangement parameter in each third area according to the coordinate of each third area includes: determining a width parameter $W_3$ of each third area according to the design requirement; in accordance with a fourth preset regulation, determining a first distance parameter $O_3$ of each third area according to the width parameter $W_3$ and a third preset adjustment parameter factor $k_3$; wherein the fourth preset regulation includes $O_3=W_3/2+k_3$; determining the corresponding third metal wire arrangement parameter in each third area according to the coordinate of each third area by using following formulas:

$$S_3=\{\{(X_n+W_{Mn})-(X_n)\}-i*W_3\}/(i-1);$$

$$P_3=\{(X_n+W_{Mn})-(X_n)\}+S_3;$$

wherein $W_3$ is the width parameter of each third area, $S_3$ is the second distance parameter of each third area, $P_3$ is the third distance parameter of each third area, i is a number of metal wires in each group, $(X_n+W_{Mn})$ is an abscissa of a second or fourth vertex coordinate of each third area, $X_n$ is an abscissa of a first or third vertex coordinate of each third area, n is the serial number of the memory macro cell.

In another aspect of the present disclosure, an electronic device is provided, including: a processor; and a memory for storing executable instructions of the processor; wherein, the processor is configured to perform the power supply network design method according to any one of the above embodiments by executing the executable instructions.

In another aspect of the present disclosure, a power supply network design apparatus is provided, including: a coordinate identification unit, configured to identify a coordinate of each memory macro cell in a power domain to be processed, the memory macro cell being rectangular, the coordinate including plane coordinates of four corners of the memory macro cell; a coordinate determination unit, configured to determine a coordinate of a first area, a coordinate of each second area and a coordinate of each third area in the power domain to be processed according to the coordinate of each memory macro cell in the power domain to be processed, wherein the second area includes an area between adjacent memory macro cells, the third area includes an area of each independent memory macro cell, and the first area includes an area excluding the first area and the second area; a parameter determination unit, configured to: determine a first metal wire arrangement parameter in the first area in the power domain to be processed according to a design requirement, determine a corresponding second metal wire arrangement parameter in each second area according to the coordinate of each second area, and determine a corresponding third metal wire arrangement parameter in each third area according to the coordinate of each third area; a network arrangement unit, configured to perform a power supply network arrangement respectively on the first area, each second area and each third area in the power domain to be processed according to the determined first metal wire arrangement parameter, the determined second metal wire arrangement parameter, and the determined third metal wire arrangement parameter.

Optionally, the determining, by the coordinate determination unit, the coordinate of each second area in the power domain to be processed according to the coordinate of each memory macro cell in the power domain to be processed includes: serving every two memory macro cells with consecutive serial numbers and a second area therebetween among various memory macro cells as an analysis unit according to a serial number of each memory macro cell in the power domain to be processed; determining the coordinate of the second area between the two memory macro cells with the consecutive serial numbers according to coordinates of the two memory macro cells with the consecutive serial numbers in each analysis unit.

Optionally, the determining, by the coordinate determination unit, the coordinate of the second area between the two memory macro cells with the consecutive serial numbers according to the coordinates of the two memory macro cells with the consecutive serial numbers in each analysis unit includes: serving a second vertex coordinate and a fourth vertex coordinate of a memory macro cell of a former serial number in the two memory macro cells with the consecutive serial numbers in each analysis unit respectively as a first vertex coordinate and a third vertex coordinate of the second area between the two memory macro cells with the consecutive serial numbers; serving a first vertex coordinate and a third vertex coordinate of a memory macro cell of a later serial number in the two memory macro cells with the consecutive serial numbers in each analysis unit respectively as a second vertex coordinate and a fourth vertex coordinate of the second area between the two memory macro cells with the consecutive serial numbers.

Optionally, the coordinate determination unit is further configured to: determine whether the second area exists between the two memory macro cells with the consecutive serial numbers in each analysis unit before determining the coordinate of the second area between the two memory macro cells with the consecutive serial numbers according to the coordinates of the two memory macro cells with the consecutive serial numbers in each analysis unit.

Optionally, the determining, by the coordinate determination unit, whether the second area exists between the two memory macro cells with the consecutive serial numbers in each analysis unit includes: determining whether a difference value between an abscissa of the first vertex coordinate/the third vertex coordinate of the memory macro cell of the later serial number in the two memory macro cells with the consecutive serial numbers and an abscissa of the second vertex coordinate or the fourth vertex coordinate of the memory macro cell of the former serial number in the two memory macro cells with the consecutive serial numbers is greater than zero; determining that the second area exists between the two memory macro cells with the consecutive serial numbers when the difference value between the abscissa of the first vertex coordinate/the third vertex coordinate of the memory macro cell of the later serial number in the two memory macro cells with the consecutive serial numbers and the abscissa of the second vertex coordinate or the fourth vertex coordinate of the memory macro cell of the former serial number in the two memory macro cells with the consecutive serial numbers is greater than zero.

Optionally, at least one of the first metal wire arrangement parameter, the second metal wire arrangement parameter, and the third metal wire arrangement parameter includes: a first distance parameter, configured to be a distance O between a middle position of a first metal wire on a first side and a first side edge of an area, wherein the first metal wire is in a first group of metal wires on the first side of the area; a second distance parameter, configured to be a distance S between two adjacent metal wires in each group of metal wires; a third distance parameter, configured to be a distance P between two first metal wires respectively on two first sides of two adjacent groups of metal wires; a width parameter, configured to be a width W of each metal wire in each group of metal wires.

Optionally, the determining, by the parameter determination unit, the first metal wire arrangement parameter in the first area in the power domain to be processed according to the design requirement includes: determining a width parameter $W_1$ and a second distance parameter $S_1$ of each first area according to the design requirement; in accordance with a first preset regulation, determining a first distance parameter $O_1$ of each first area according to the width parameter $W_1$ and a first preset adjustment parameter factor $k_1$ of each first area; in accordance with a second preset regulation, determining a third distance parameter $P_1$ of each first area according to the width parameter $W_1$ and the second distance parameter $S_1$ of each first area; wherein the first preset regulation includes $O_1=W_1/2+k_1$; the second preset regulation includes: $P_1=i(W_1+S_1)$; wherein $W_1$ is the width parameter of each first area, $S_1$ is the second distance parameter of each first area, $P_1$ is the third distance parameter of each first area, and i is a number of metal wires in each group;

and/or, the determining, by the parameter determination unit, the corresponding second metal wire arrangement parameter in each second area according to the coordinate of each second area includes: determining a width parameter $W_2$ of each second area according to the design requirement; in accordance with a third preset regulation, determining a first distance parameter $O_2$ of each second area according to the width parameter $W_2$; wherein the third preset regulation includes $O_2=W_2/2$; determining the second distance parameter $S_2$ and the third distance parameter $P_2$ of each second area according to the coordinate of each second area by using following formulas:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

$W_2$ is the width parameter of each second area, $S_2$ is the second distance parameter of each second area, $P_2$ is the third distance parameter of each second area, i is the number of metal wires in each group, $(X_{n+1})$ is an abscissa of a second or fourth vertex coordinate of each second area, $(X_n+W_{Mn})$ is an abscissa of a first or third vertex coordinate of each second area, n is the serial number of the memory macro cell;

and/or, the determining, by the parameter determination unit, the corresponding third metal wire arrangement parameter in each third area according to the coordinate of each third area includes: determining a width parameter $W_3$ of each third area according to the design requirement; in accordance with a fourth preset regulation, determining a first distance parameter $O_3$ of each third area according to the width parameter $W_3$ and a third preset adjustment parameter factor $k_3$; wherein the fourth preset regulation includes $O_3=W_3/2+k_3$; determining the corresponding third metal wire arrangement parameter in each third area according to the coordinate of each third area by using following formulas:

$S_3=\{\{(X_n+W_{Mn})-(X_n)\}-i*W_3\}/(i-1)$;

$P_3=\{(X_n+W_{Mn})-(X_n)\}+S_3$;

$W_3$ is the width parameter of each third area, $S_3$ is the second distance parameter of each third area, $P_3$ is the third distance parameter of each third area, i is a number of metal wires in each group, $(X_n+W_{Mn})$ is an abscissa of a second or fourth vertex coordinate of each third area, $X_n$ is an abscissa of a first or third vertex coordinate of each third area, n is the serial number of the memory macro cell.

In another aspect of the present disclosure, a storage medium is provided, on which a computer program is stored, the steps of the method of any one of the above-mentioned embodiments are implemented when the computer program is executed by a processor.

According to the technical solution of the present disclosure, for the multi-power domain design of the chip, the partition of the power supply network area is completed by identifying the coordinate of each memory macro cell and processing the coordinate; after the partition of the area is completed, the coordinate information of the area is utilized to calculate the metal wire arrangement parameter, and then a power supply network that meets the requirement is generated according to the coordinate of each area and the metal wire arrangement parameter. In the disclosure, a related algorithm is employed to replace the implementation of the partial traditional power supply network, and the basic power supply network implementation can be completed only by a simple configuration. The preset disclosure can realize the automatic design of the power supply network, improve a work efficiency, shorten a design cycle, have a high accuracy and a simple structure, and is suitable for the power supply network designs of all chips, and especially ensures the stability of chip power supply under a highly complex design.

BRIEF DESCRIPTION OF THE DRAWINGS

The accompanying drawings described here are utilized to provide further understanding of the present disclosure and constitute a part of the disclosure. The exemplary embodiments in the disclosure and descriptions thereof are provided to explain the disclosure, and do not constitute an improper limitation to the disclosure. In the drawings.

DETAILED DESCRIPTION

In order to make the purpose, technical solution, and advantages of the present disclosure clearer, the technical solution of the present disclosure will be described clearly and completely in conjunction with specific embodiments of the present disclosure and the corresponding drawings. Apparently, the described embodiments are merely part of the embodiments of the present disclosure, rather than all the embodiments. Based on the embodiments in the disclosure, all other embodiments obtained by those of ordinary skill in the art without creative work shall fall within the protection scope of the present disclosure.

It should be noted that the terms "first" and "second" in the specification and claims of the disclosure and the above-mentioned drawings are used for distinguishing similar objects, and are not necessarily used for describing a specific sequence or order. It should be understood that the data used in this way can be interchanged under appropriate circumstances, so that the embodiments of the present disclosure described herein can be implemented in a sequence other than those illustrated or described herein. In addition, the terms "including" and "having" and any variations of them are intended to cover non-exclusive inclusions. For example, a process, method, system, product, or device that includes a series of steps or units is not definitely limited to those clearly listed, but those steps or units may include other steps or units which are not clearly listed or are inherent to these processes, methods, products, or devices.

Figure 1:
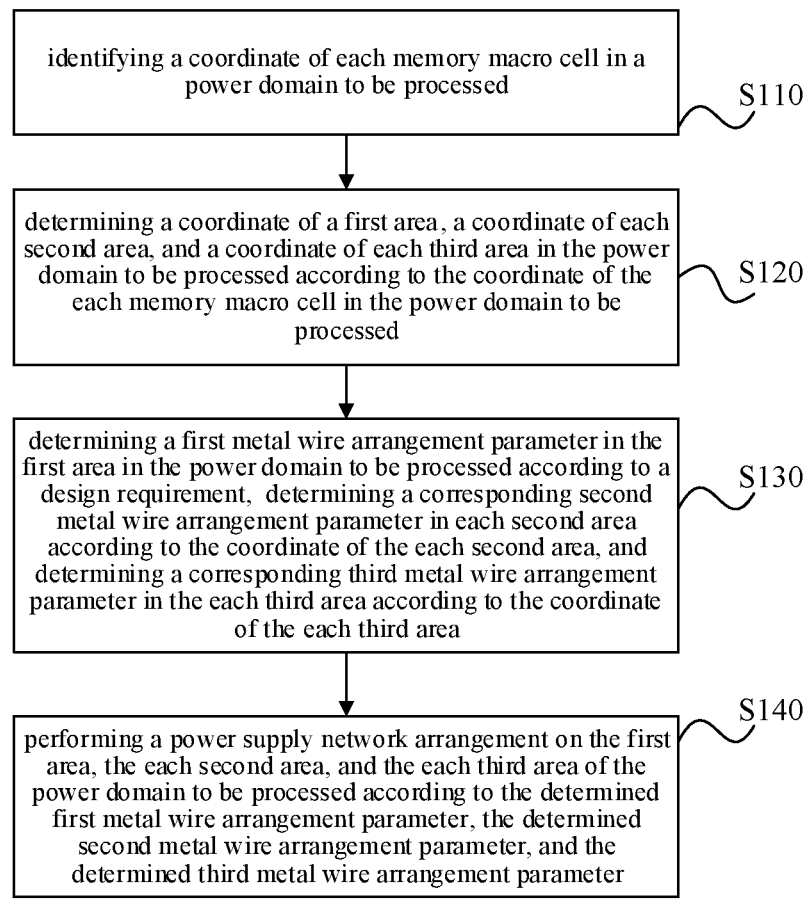
FIG. 1 is a schematic diagram showing a power supply network design method according to an embodiment of the present disclosure.

FIG. 1 is a schematic diagram showing a power supply network design method provided by the present disclosure. The method in the disclosure is applicable to the design of the power supply network of the chip with multiple power domains.

As shown in FIG. 1, according to some embodiments of the present disclosure, the method for designing a multi-power domain power supply network of a chip at least includes step S110, step S120, step S130, and step S140.

Step S110: a coordinate of each memory macro cell in a power domain to be processed is identified in the power domain to be processed.

Figure 2:
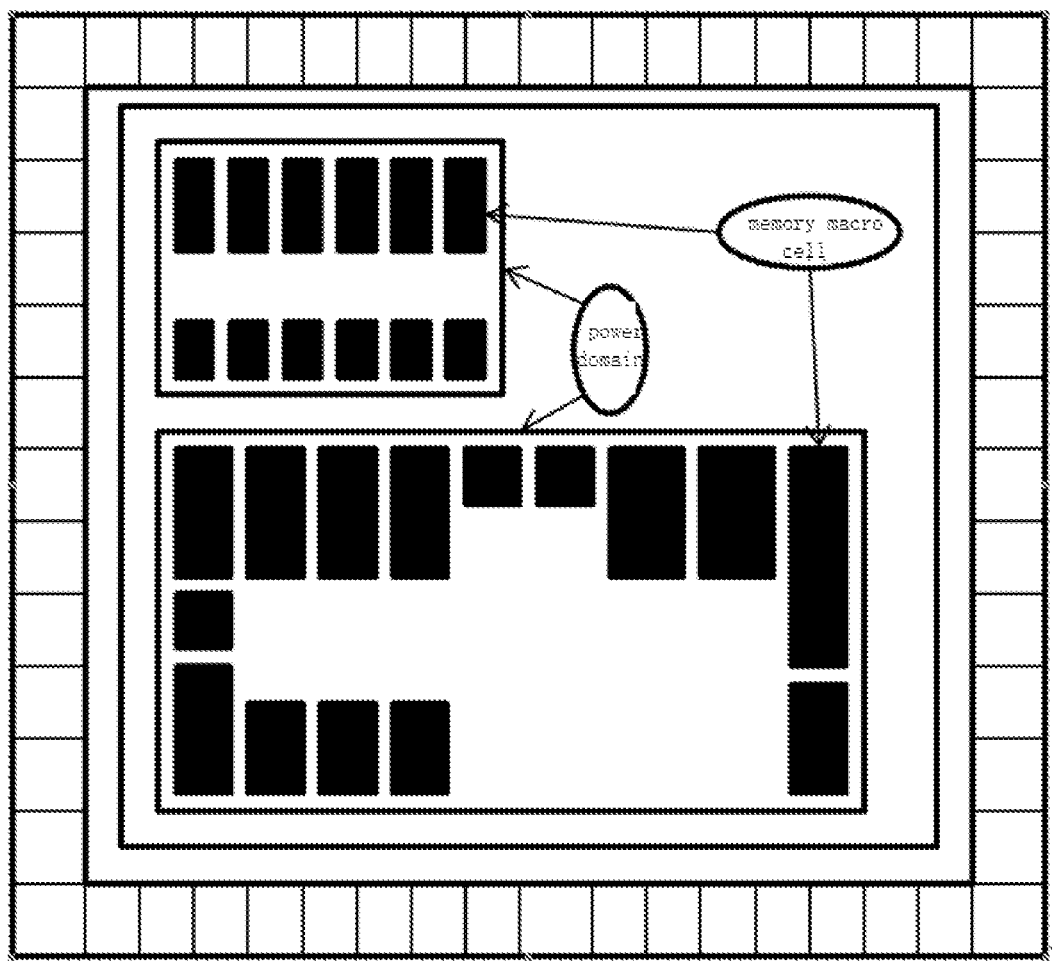
FIG. 2 is a schematic diagram illustrating a chip structure.
Figure 3:
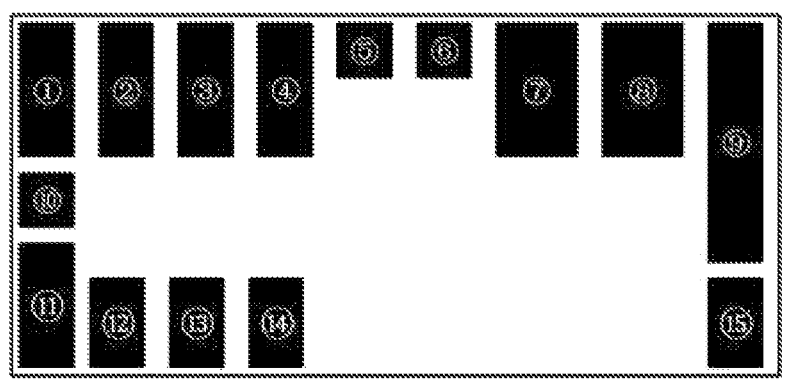
FIG. 3 is a schematic diagram of numbering memory macro cells in a power domain.

The structure of the chip is shown in FIG. 2. If there are no multiple power domains, it can be handled as a single power domain. Under each power domain, there are a plurality of memory macro cells. As shown in FIG. 3, for a single power domain, all memory macro cells in the power domain are found out and numbered in sequence. The coordinate of each memory macro cell in the power domain is identified. Specifically, the coordinate of each memory macro cell in the power domain can be identified through a pre-written program. The memory macro cell is rectangular, and the coordinate can specifically be plane coordinates of four vertices of the memory macro cell.

Figures 4A, 4B:
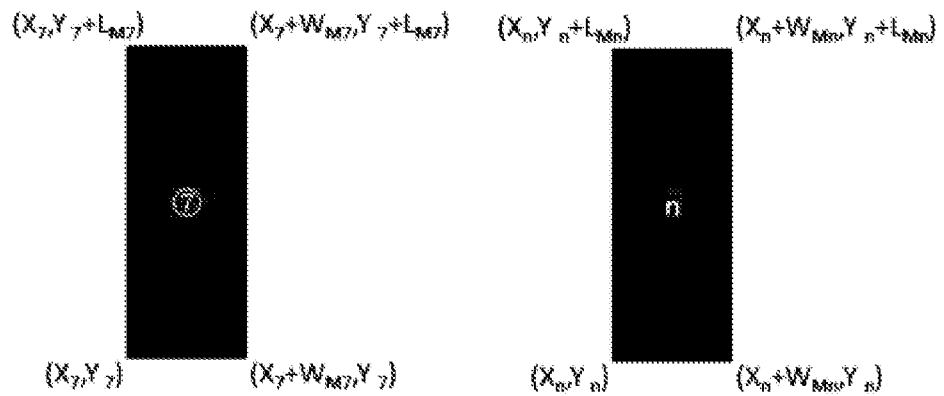
FIG. 4a is a schematic diagram illustrating coordinates of a seventh memory macro cell.
FIG. 4b is a schematic diagram illustrating coordinates of a n-th memory macro cell.

As shown in FIGS. 4a and 4b, the coordinates of all memory macro cells in one power domain are recorded using the coordinates of four points, that is, the coordinates of the four vertices of the memory macro cell are recorded, respectively, the first vertex coordinate, the second vertex coordinate, the third vertex coordinate, and the fourth vertex coordinate. Specifically, a side opposite to a left side of a viewer is the left side, and a side opposite to a right side of the viewer is the right side. The first vertex coordinate is a coordinate of a left upper vertex of the memory macro cell; and the second vertex coordinate is a coordinate of a right upper vertex of the memory macro cell; the third vertex coordinate is a coordinate of a left lower vertex of the memory macro cell; and the fourth vertex coordinate is a coordinate of a right lower vertex of the memory macro cell. As shown in FIGS. 4a and 4b, the coordinates of the seventh memory macro cell are $(X_7, Y_7)$, $(X_7+W_{M7}, Y_7)$, $(X_7, Y_7+L_{M7})$, $(X_7+W_{M7}, Y_7+L_{M7})$; the coordinates of the n-th memory macro cell are $(X_n, Y_n)$, $(X_n+W_{Mn}, Y_n)$, $(X_n, Y_n+L_{Mn})$, $(X_n+W_{Mn}, Y_n+L_{Mn})$, that is, the first vertex coordinate of the n-th memory macro cell is $(X_n, Y_n)$, the second vertex coordinate of the n-th memory macro cell is $(X_n+W_{Mn}, Y_n)$, the third vertex coordinate of the n-th memory macro cell is $(X_n, Y_n+L_{Mn})$, and the fourth vertex coordinate of the n-th memory macro cell is $(X_n+W_{Mn}, Y_n+L_{Mn})$. Here, $W_{Mn}$ represents a width of the n-th memory macro cell, and $L_{Mn}$ represents a length of the n-th memory macro cell.

Step S120: a coordinate of a first area, a coordinate of each second area, and a coordinate of each third area in the power domain to be processed are determined according to the coordinate of each memory macro cell in the power domain to be processed.

Figure 5A:
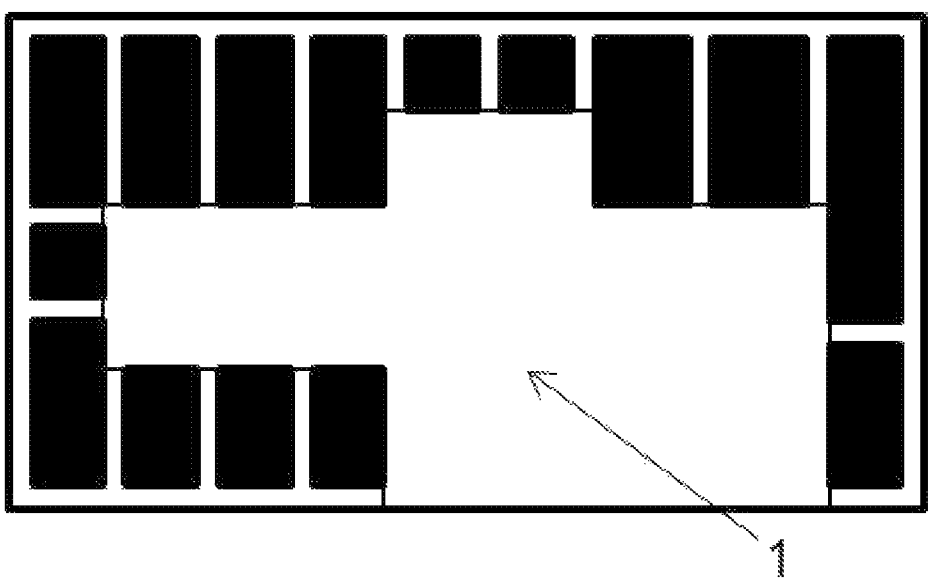
FIG. 5a is a schematic diagram illustrating a first area in a power domain.
Figure 5B:
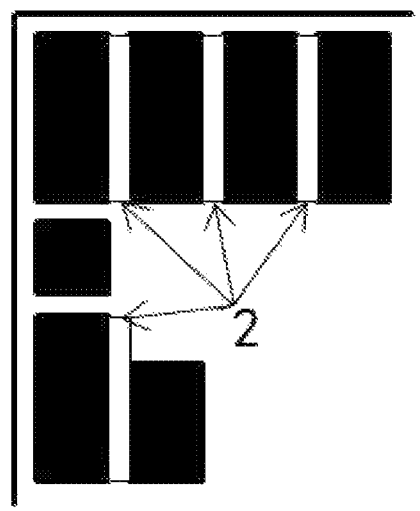
FIG. 5b is a schematic diagram illustrating a second area in a power domain.
Figure 5C:
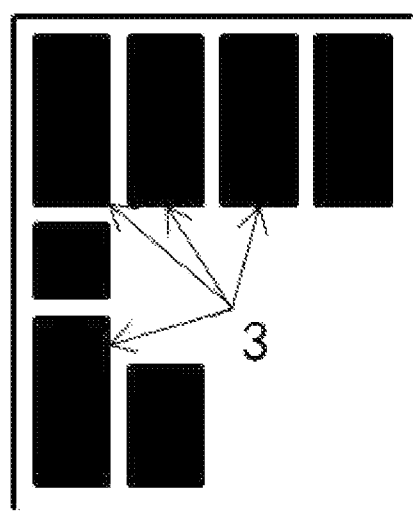
FIG. 5c is a schematic diagram illustrating a third area in a power domain.

Specifically, the second area includes an area between adjacent memory macro cells, referring to the area 2 shown in FIG. 5b. The third area includes an area of each independent memory macro cell, referring to the area 3 shown in FIG. 5c. The first area includes an area excluding all the second area and the third area, referring to the area 1 shown in FIG. 5a.

Figure 6:
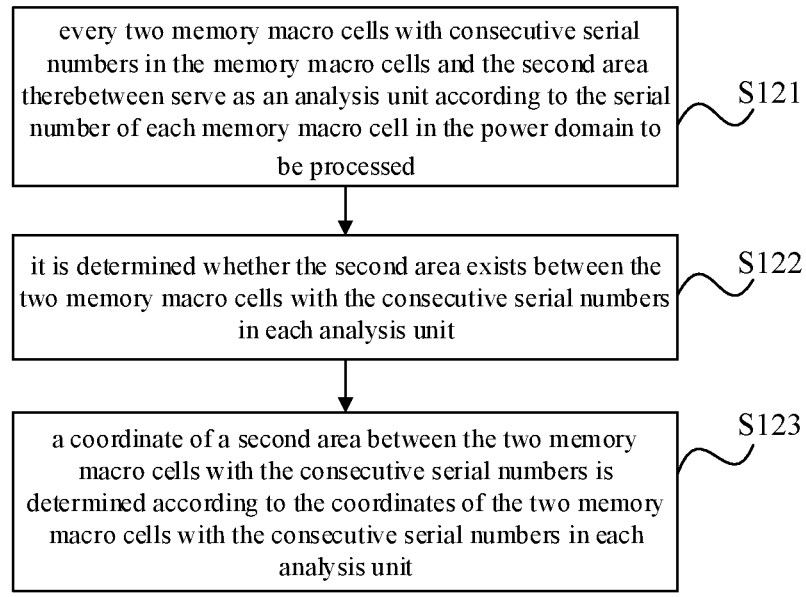
FIG. 6 is a flow chart showing a specific implementation of a step of determining a coordinate of each second area in a power domain to be processed according to a coordinate of each memory macro cell in the power domain to be processed according to some embodiments of the present disclosure.

The method for determining a coordinate of an area will be detailed according to the different areas.
For the second area FIG. 6 is a flow chart showing a specific implementation of a step of determining a coordinate of each second area in a power domain to be processed according to a coordinate of each memory macro cell in the power domain to be processed according to some embodiments of the present disclosure. As shown in FIG. 6, the step S120 includes a step S121 and a step S122.

Step S121: every two memory macro cells with consecutive serial numbers in the memory macro cells and the second area between the two memory macro cells serve as an analysis unit according to the serial number of each memory macro cell in the power domain to be processed.

Figure 7:
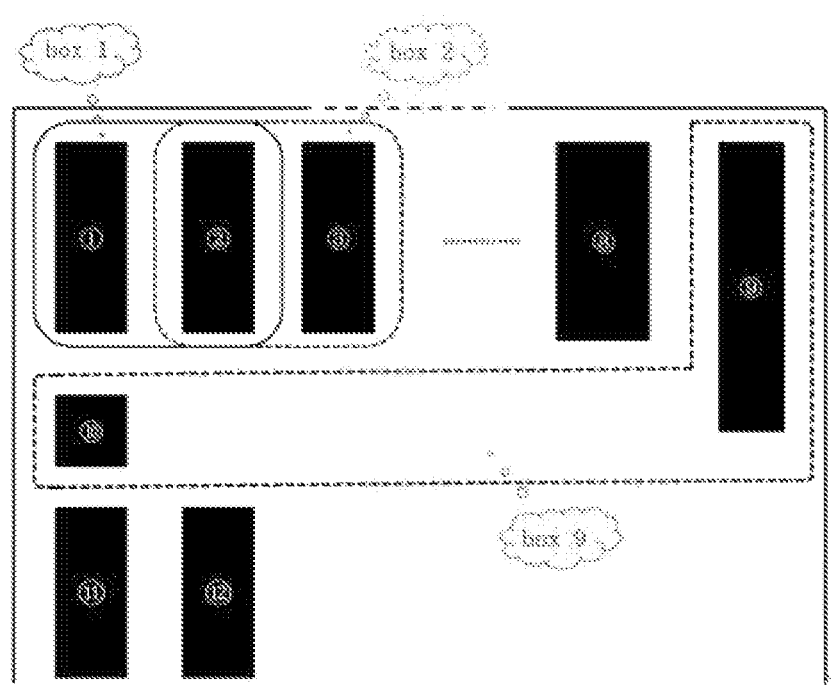
FIG. 7 is a schematic diagram showing a box division method of a second area.

Specifically, in some embodiments, every two adjacent memory macro cells are combined according to the serial number of each memory macro cell (for example, a script language is used for looping), for example, ①and ②and a second area therebetween serve as an analysis unit; ②and ③and a second area therebetween serve as an analysis unit, ... , ⑬and ⑭and a second area therebetween serve as an analysis unit; ⑭and ⑮and a second area therebetween serve as an analysis unit. As shown in FIG. 7, every two memory macro cells and the second area therebetween (an analysis unit) are regarded as a box. The specific algorithm is that, if there are a total of n memory macro cells in one power domain, (b, b+1) is taken to form a box b, and a value range of b includes 1, 2, ... , n−1, then there is a total of n−1 boxes. ①and ②and the area therebetween serve as a box 1; ②and ③and the area therebetween serve as a box 2; ... ; ⑨and ⑩and the area therebetween serve as a box 9.

Step S123: a coordinate of a second area between the two memory macro cells with the consecutive serial numbers is determined according to the coordinates of the two memory macro cells with the consecutive serial numbers in each analysis unit.

Specifically, a second vertex coordinate of a memory macro cell of a former serial number in the two memory macro cells with the consecutive serial numbers in each analysis unit is regarded as a first vertex coordinate of the second area between the two memory macro cells with the consecutive serial numbers; a fourth vertex coordinate of the memory macro cell of the former serial number in the two memory macro cells with the consecutive serial numbers in each analysis unit is regarded as a third vertex coordinate of the second area between the two memory macro cells with the consecutive serial numbers. A first vertex coordinate of a memory macro cell of a later serial number in the two memory macro cells with the consecutive serial numbers in each analysis unit is regarded as a second vertex coordinate of the second area between the two memory macro cells with the consecutive serial numbers; a third vertex coordinate of the memory macro cell of the later serial number in the two memory macro cells with the consecutive serial numbers in each analysis unit is regarded as a fourth vertex coordinate of the second area between the two memory macro cells with the consecutive serial numbers. A side opposite to a left side of the viewer is the left side, and a side opposite to a right side of the viewer is the right side. In some embodiments, the first vertex coordinate is a left upper vertex coordinate, the second vertex coordinate is an right upper vertex coordinate, and the third vertex coordinate is a left lower vertex coordinate, and the fourth vertex coordinate is a right lower vertex coordinate.

Figure 8:
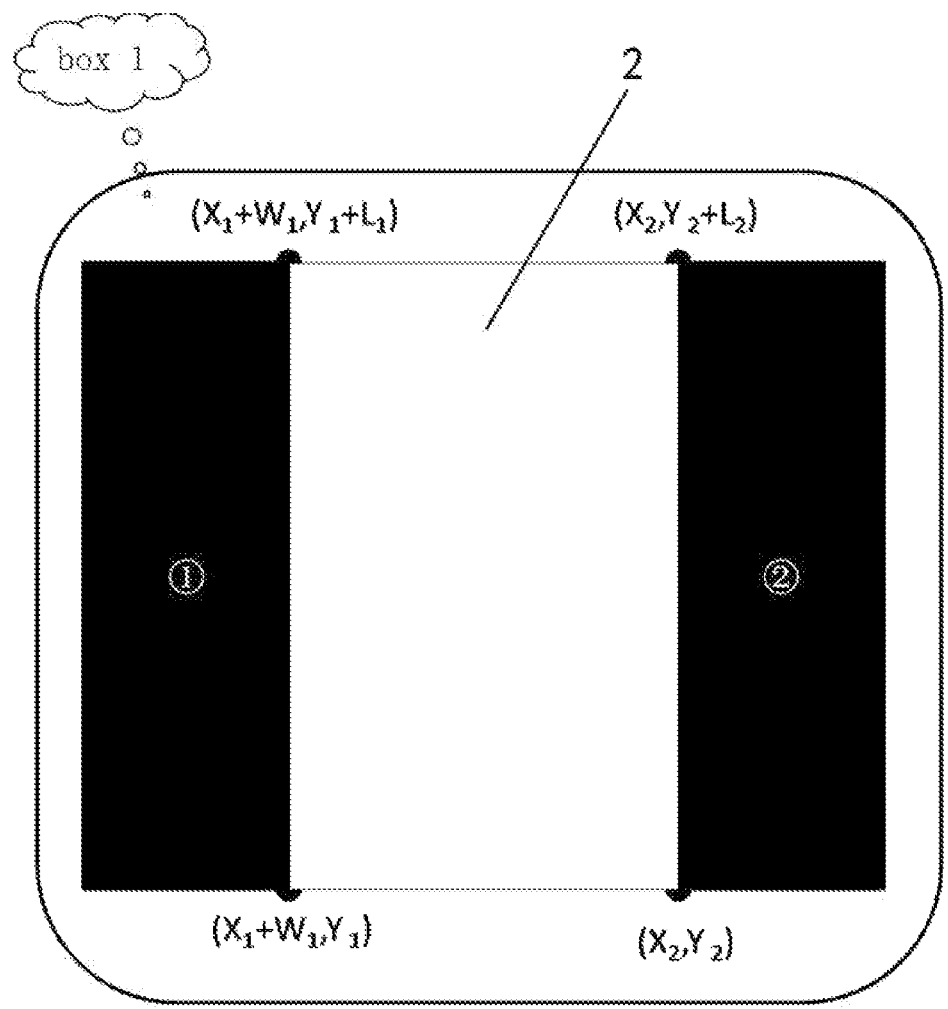
FIG. 8 is a schematic diagram showing a coordinate of a second area in a box composed of a first memory macro cell and a second memory macro cell.

As shown in FIG. 8, one box (box 1) is taken for analysis (b=1). The right lower vertex coordinate $(X_1+W_{M1}, Y_1)$ and the right upper vertex coordinate $(X_1+W_{M1}, Y_1+L_{M1})$ of the first memory macro cell ① (equivalent to the b-th one), and the left lower vertex coordinate $(X_2, Y_2)$ and the left upper vertex coordinate $(X_2, Y_2+L_{M2})$ of the second memory macro cell ② (equivalent to the (b+1)-th one) are taken as a coordinate of the second area 2 therebetween. Here the right lower vertex coordinate $(X_1+W_{M1}, Y_1)$ and the right upper vertex coordinate $(X_1+W_{M1}, Y_1+L_{M1})$ of the memory macro cell ① serve as the left lower vertex coordinate and the left upper vertex coordinate of the second area between ① and ②, respectively. The left lower vertex coordinate $(X_2, Y_2)$ and the left upper vertex coordinate $(X_2, Y_2+L_{M2})$ of the memory macro cell ②  serve as the right lower vertex coordinate and the left upper vertex coordinate of the second area between ① and ②, respectively. The coordinates of the four vertexes taken out form a new closed area {($X_2$, $Y_2+L_{M2}$) ($X_1+W_{M1}$, $Y_1+L_{M1}$) ($X_2$, $Y_2$) ($X_1+W_{M1}$, $Y_1$)}, and so on, to determine all legal areas 2 between adjacent memory macro cells.

However, not all areas between the memory macro cells with consecutive serial numbers are legal. As shown in FIG. 7, the memory macro cells ⑨ and ⑩ are located on both sides of the voltage domain area, and the serial numbers thereof are adjacent, but they are actually not adjacent to each other, so there is no second area therebetween, and no processing is required to obtain the coordinate of the corresponding second area. Therefore, it is needed to determine whether there is the area 2.

Specifically, as shown in FIG. 6, before the step S123, step S122 is further included.

Step S122: it is determined whether the second area exists between the two memory macro cells with the consecutive serial numbers in each analysis unit. That is, the step S123 is performed if the second area exists between two memory macro cells with consecutive serial numbers; and a coordinate of the second area between the two memory macro cells with the consecutive serial numbers according to coordinates of the two memory macro cells with the consecutive serial numbers in each analysis unit.

Specifically, it is determined whether a difference value between an abscissa of the first vertex (the left upper vertex) coordinate or the third vertex (left lower vertex) coordinate of the memory macro cell with the later serial number and an abscissa of the second vertex (right upper vertex) coordinate or the fourth vertex (right lower vertex) coordinate of the memory macro cell with the former serial number in the two memory macro cells with consecutive serial numbers is greater than zero; if yes, it is determined that the second area exists between the two memory macro cells with the consecutive serial numbers. That is to say, the coordinates of two memory macro cells with consecutive serial numbers are calculated to determine whether $[(X_{+1}-(X_n+W_{Mn})]$ is greater than 0, if it is greater than 0, a legal area 2 is generated, otherwise this step is skipped and no legal area 2 is generated. The final effect is shown as the area 2 in FIG. 5b.

For the third area:

The third area includes an area of each independent memory macro cell. Therefore, a coordinate of each independent memory macro cell is a coordinate of the third area of each memory macro cell.

For the first area:

The first area includes an area excluding all the first areas and the second areas, that is, all the second areas and the third areas are removed from the power domain area, and the remaining area is the first area.

Step S130: a first metal wire arrangement parameter in the first area in the power domain to be processed is determined according to a design requirement, and a corresponding second metal wire arrangement parameter in each second area is determined according to the coordinate of each second area, and a corresponding third metal wire arrangement parameter in each third area is determined according to the coordinate of each third area.

In some embodiments, the first metal wire arrangement parameter, the second metal wire arrangement parameter, and/or the third metal wire arrangement parameter specifically include a first distance parameter, a second distance parameter, a third distance parameter, and a width parameter.

Figure 9A:
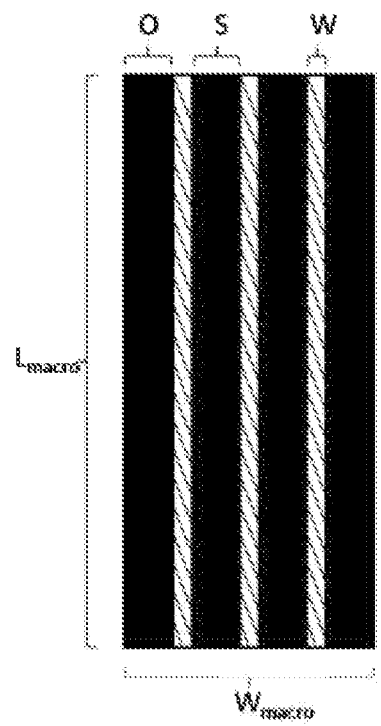
FIG. 9a is a schematic diagram illustrating labels of metal wire arrangement parameters and a power supply network in a third area.
Figure 9B:
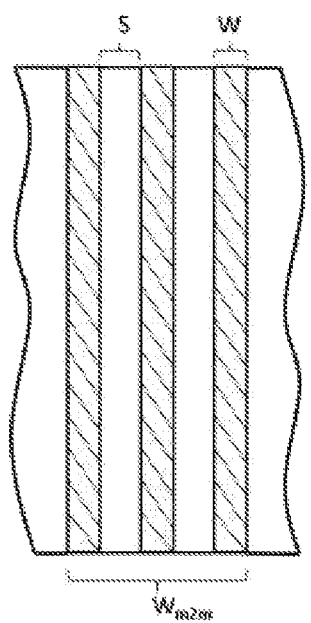
FIG. 9b is a schematic diagram illustrating labels of metal wire arrangement parameters and a power supply network in a second area.
Figure 9C:
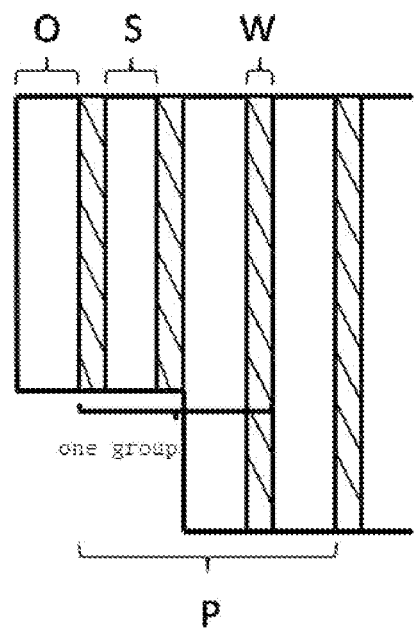
FIG. 9c is a schematic diagram illustrating labels of metal wire arrangement parameters and a power supply network in a first area.

The first distance parameter is a distance O between a middle position of a first metal wire on the first side and a first side edge of an area, in which the first metal wire is in a first group of metal wires on the first side of the area in which the first group of metal wires are located. For example, the first side is the left side, and the first distance parameter is the distance between a middle position of a first metal wire on the left side and a left side edge of an area, in which the first metal wire is in a first group of metal wires on the left side of the area in which the first group of metal wires are located. The second distance parameter is a distance S between two adjacent metal wires in each group of metal wires. The third distance parameter is a distance P between two first metal wires respectively on the first sides of two adjacent groups of metal wires. For example, the first side is the left side, the third distance is the distance P between two first metal wires respectively on the left sides of two adjacent groups of metal wires. The width parameter is a width W of each metal wire in each group of metal wires. Specifically, reference can be made to FIGS. 9a, 9b and 9c, Lmacro represents a length of the memory macro cell, Wmacro represents a width of the memory macro cell, and Wm2m represents a width of the second area.

A method for determining a metal wire arrangement parameter will be detailed according to different areas.

(1) The step of determining the first metal wire arrangement parameter in the first area of the power domain to be processed according to the design requirement specifically includes:

the width parameter $W_1$ and the second distance parameter $S_1$ of each first area are determined according to the design requirements; the second distance parameter $S_1$ is greater than a minimum value of the width parameter $W_1$;

according to a first preset regulation, the first distance parameter $O_1$ of each first area is determined according to the width parameter $W_1$ of each first area and a first preset adjustment parameter factor IQ; and the first preset regulation can specifically be $O_1=W_1/2+k_1$;

according to a second preset regulation, the third distance parameter $P_1$ of each first area is determined according to the width parameter $W_1$ and the second distance parameter $S_1$ of each first area; the second preset regulation can specifically be $P_1=i(W_1+S_1)$;

$W_1$ is the width parameter of each first area, $S_1$ is the second distance parameter of each first area, $P_1$ is the third distance parameter of each first area, and i is the number of metal wires in each group.

(2) The step of determining the corresponding second metal wire arrangement parameter in each second area according to the coordinate of each second area specifically includes:

the width parameter $W_2$ of each second area is determined according to the design requirement;

according to the third preset regulation, the first distance parameter $O_2$ of each second area is determined according to the width parameter $W_2$; the third preset regulation can specifically be $O_2=W_2/2$;

the second distance parameter $S_2$ and the third distance parameter $P_2$ of each second area are respectively determined according to the coordinate of each second area by using the following formula:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

where, $W_2$ is the width parameter of each second area, $S_2$ is the second distance parameter of each second area, $P_2$ is the third distance parameter of each second area, i is the number of metal wires in each group, $(X_{n+1})$ is the abscissa of the second or fourth vertex coordinate of each second area, $(X_n+W_{Mn})$ is the abscissa of the first or third vertex coordinate of each second area; n is the serial number of the memory macro cell.

(3) The step of determining the corresponding third metal wire arrangement parameter in each third area according to the coordinate of each third area specifically includes:

the width parameter $W_3$ of each third area is determined according to the design requirement;

according to the fourth preset regulation, the first distance parameter $O_3$ of each third area is determined according to the width parameter $W_3$ and a third preset adjustment parameter factor $k_3$; the fourth preset regulation can specifically be $O_3=W_3/2+k_3$;

the corresponding third metal wire arrangement parameter in each third area is determined according to the coordinate of each third area by using the following formulas:

$$S_3=\{\{(X_n+W_{Mn})-(X_n)\}-i*W_3\}/(i-1);$$

$$P_3=\{(X_n+W_{Mn})-(X_n)\}+S_3;$$

where, $W_3$ is the width parameter of each third area, $S_3$ is the second distance parameter of each third area, $P_3$ is the third distance parameter of each third area, i is the number of metal wires in each group, $(X_n+W_{Mn})$ is the abscissa of the second or fourth vertex coordinate of each third area, is the abscissa of the first or third vertex coordinate of each third area; n is the serial number of the memory macro cell.

Step S140: a power supply network arrangement is performed respectively on the first area, each second area and each third area in the power domain to be processed according to the determined first metal wire arrangement parameter, second metal wire arrangement parameter, and third metal wire arrangement parameter.

Specifically, in some embodiments, after the first metal wire arrangement parameter corresponding to the first area, the second metal wire arrangement parameter corresponding to each second area, and the third metal wire arrangement parameter corresponding to each third area are determined, the power supply network arrangement is performed on the first area, each second area and each third area in the power domain to be processed according to the corresponding metal wire arrangement parameters.

Figure 10:
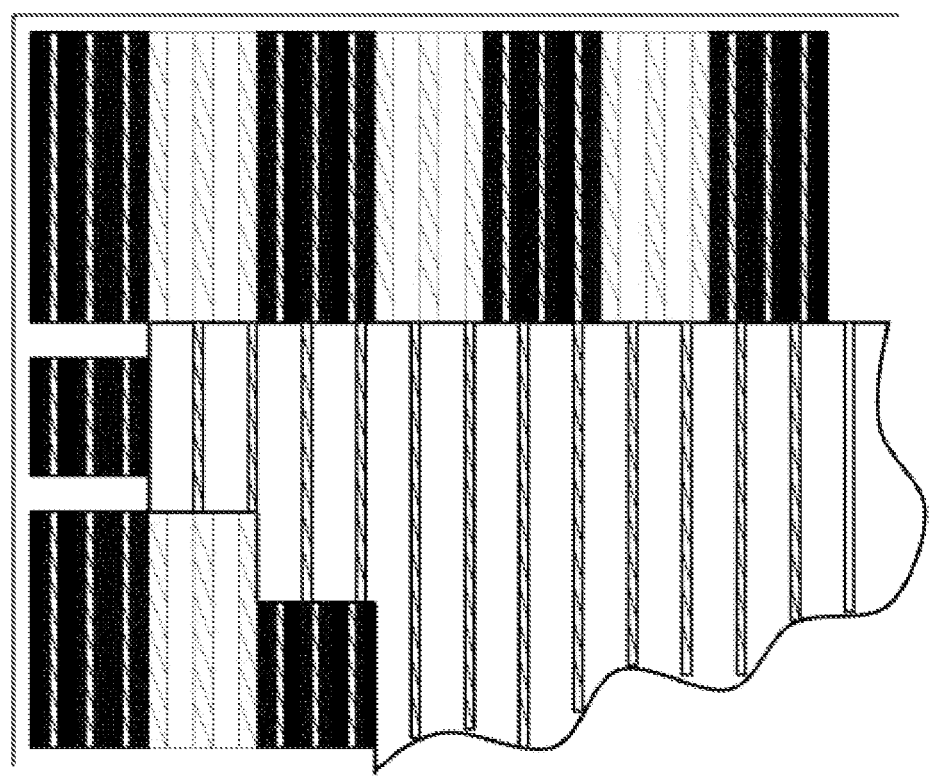
FIG. 10 is an effect diagram according to a completed arrangement design of a power supply network in each area.

FIG. 10 shows an effect diagram according to a completed arrangement design of a power supply network in each area.

Figure 11:
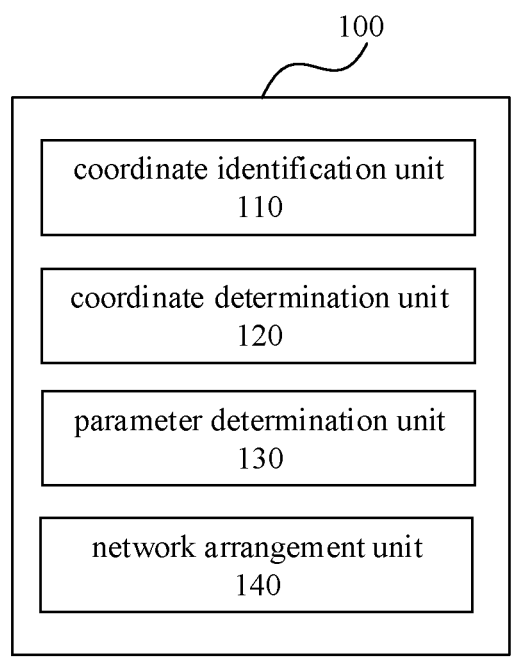
FIG. 11 is a schematic structure diagram of a power supply network design apparatus according to some embodiments of the present disclosure.

FIG. 11 is a schematic structure diagram of a power supply network design apparatus provided by the present disclosure. As shown in FIG. 11, the power supply network design apparatus 100 includes: a coordinate identification unit 110, a coordinate determination unit 120, a parameter determination unit 130 and a network arrangement unit 140.

The coordinate identification unit 110 is configured to identify the coordinate of each memory macro cell in a power domain to be processed; the memory macro cell is rectangular; the coordinate includes plane coordinates of the four corners of the memory macro cell. The coordinate determination unit 120 is configured to determine a coordinate of a first area, a coordinate of each second area, and a coordinate of each third area in the power domain to be processed according to the coordinate of each memory macro cell in the power domain to be processed. The second area includes an area between adjacent memory macro cells; the third area includes an area of each independent memory macro cell; and the first area includes an area excluding the first area and the second area; the parameter determination unit 130 is configured to determine a first metal wire arrangement parameter in the first area in the power domain to be processed according to a design requirement, determine a corresponding second metal wire arrangement parameter in each second area according to the coordinate of the each second area, and determine a corresponding third metal wire arrangement parameter in each third area according to the coordinate of the each third area. The network arrangement unit 140 is configured to perform a power supply network arrangement on the first area in the power domain to be processed according to the determined coordinate of the first area and the corresponding first metal wire arrangement parameter, perform the power supply network arrangement on each second area in the power domain to be processed according to the determined coordinate of each second area and the corresponding second metal wire arrangement parameter, and perform the power supply network arrangement on each third area in the power domain to be processed according to the determined coordinate of each third area and the corresponding third metal wire arrangement parameter.

The coordinate identification unit 110 is configured to identify the coordinate of each memory macro cell in the power domain to be processed.

The structure of the chip is shown in FIG. 2. If there are no multiple power domains, it can be handled as a single power domain. Under each power domain, there are a plurality of memory macro cells. As shown in FIG. 3, for a single power domain, all memory macro cells in the power domain are found out and numbered in sequence. The coordinate of each memory macro cell in the power domain is identified. Specifically, in some embodiments, the coordinate of each memory macro cell in the power domain is identified through a pre-written program. The memory macro cell is rectangular, and the coordinate is specifically the plane coordinates of four vertices of the memory macro cell.

As shown in FIGS. 4a and 4b, coordinates of all memory macro cells in one power domain are recorded by using coordinates of four vertexes, that is, the coordinates of the four vertices of the memory macro cell are recorded, i.e., a first vertex coordinate, a second vertex coordinate, a third vertex coordinate and a fourth vertex coordinate. Specifically, a side opposite to a left side of the viewer is the left side, and a side opposite to a right side of the viewer is the right side. The first vertex coordinate is a left upper vertex coordinate of the memory macro cell; the second vertex coordinate is a right upper vertex coordinate of the memory macro cell; the third vertex coordinate is a left lower vertex coordinate of the memory macro cell; and the fourth vertex coordinate is a right lower vertex coordinate of the memory macro cell. As shown in FIGS. 4a and 4b, the coordinate of the seventh memory macro cell is represented as $(X_7, Y_7)$, $(X_7+W_{M7}, Y_7)$, $(X_7, Y_7+L_{M7})$, $(X_7+W_{M7}, Y_7+L_{M7})$. The coordinate of the n-th memory macro cell is represented as $(X_n, (X_n+W_{Mn}), (X_n, Y_n+L_{Mn}), (X_n+W_{Mn}, Y_n+LM)$, that is, the first vertex coordinate of the n-th memory macro cell is $(X_n, Y_n)$, the second vertex coordinate of the n-th memory macro cell is $(X_n+W_{Mn}, Y_n)$, the third vertex coordinate of the n-th memory macro cell is $(X_n, Y_n+LM)$, and the fourth vertex coordinate of the n-th memory macro cell is $(X_n+$ $W_{Mn}$, $Y_n+L_{Mn}$). Wm represents a width of the n-th memory macro cell, and $L_{Mn}$ represents a length of the n-th memory macro cell.

The coordinate determination unit 120 is configured to determine the coordinate of the first area, the coordinate of each second area, and the coordinate of each third area in the power domain to be processed according to the coordinate of each memory macro cell in the power domain to be processed.

Specifically, the second area includes an area between adjacent memory macro cells, referring to the area 2 shown in FIG. 5*b*. The third area includes an area of each independent memory macro cell, referring to the area 3 shown in FIG. 5*c*. The first area includes an area excluding the first area and the second area, referring to the area shown in FIG. 5*a*.

For the second area

The step of determining, by the coordinate determination unit 120, the coordinate of each second area in the power domain to be processed according to the coordinate of each memory macro cell in the power domain to be processed specifically includes: every two memory macro cells with consecutive serial numbers and the second area therebetween in each memory macro cell serve as an analysis unit according to the serial number of each memory macro cell in the power domain to be processed; the coordinate of the second area between the two memory macro cells with consecutive serial numbers is determined according to the coordinates of the two memory macro cells with the consecutive serial numbers in each analysis unit.

The step of determining, by the coordinate determination unit 120, the coordinate of the second area between the two memory macro cells with the consecutive serial numbers according to the coordinates of the two memory macro cells with the consecutive serial numbers in each analysis unit specifically includes: the second vertex coordinate and the fourth vertex coordinate of the memory macro cell with a former serial number in the two memory macro cells with consecutive serial numbers in each analysis unit respectively serve as the first vertex coordinate and the third vertex coordinate of the second area between the two memory macro cells with the consecutive serial numbers; the first vertex coordinate and the third vertex coordinate of the memory macro cell with a later serial number in the two memory macro cells with the consecutive serial numbers in the each analysis unit respectively serve as the second vertex coordinate and the fourth vertex coordinate of the second area between the two memory macro cells with the consecutive serial numbers.

The coordinate determination unit 120 is further configured to determine whether the second area exists between the two memory macro cells with the consecutive serial numbers in each analysis unit before determining the coordinate of the second area between the two memory macro cells with the consecutive serial numbers according to the coordinates of the two memory macro cells with the consecutive serial numbers in each analysis unit. The step of determining, by the coordinate determination unit, whether the second area exists between the two memory macro cells with the consecutive serial numbers in each analysis unit specifically includes: it is determined whether a difference value between an abscissa of the first vertex coordinate/third vertex coordinate of the memory macro cell with the later serial number in the two memory macro cells with the consecutive serial numbers and an abscissa of the second vertex coordinate or the fourth vertex coordinate of the memory macro cell with the former serial number in the two memory macro cells with the consecutive serial numbers is greater than zero; if yes, it is determined that the second area exists between the two memory macro cells with the consecutive serial numbers. As for the elaboration of determining, by the above-mentioned coordinate determination unit 120, the coordinate of the second area between the two memory macro cells with consecutive serial numbers according to the coordinates of the two memory macro cells with the consecutive serial numbers in each analysis unit, reference can be made to the specific implementation of determining the coordinate of each second area in the power domain to be processed in the aforementioned method embodiment, which will not be repeated here.

For the third area

The third area includes an area of each independent memory macro cell. Therefore, the coordinate of each independent memory macro cell is the coordinate of the third area of each memory macro cell.

For the first area

The first area includes an area excluding the first area and the second area, that is, all the second areas and the third areas are removed from the area of the power domain, and the remaining area is the first area.

The parameter determination unit 130 is configured to determine a first metal wire arrangement parameter in the first area in the power domain to be processed according to the design requirement, determine a corresponding second metal wire arrangement parameter in each second area according to the coordinate of each second area, and determine a corresponding third metal wire arrangement parameter in each third area according to the coordinate of each third area. In some embodiments, the first metal wire arrangement parameter, the second metal wire arrangement parameter, and/or the third metal wire arrangement parameter specifically include a first distance parameter, a second distance parameter, a third distance parameter, and a width parameter. The first distance parameter is a distance O between a middle position of a first metal wire on a first side and a first side edge of an area, in which the first metal wire is in a first group of metal wires on the first side of the area in which the first group of metal wires are located. For example, the first side is the left side, and the first distance parameter is the distance between a middle position of a first metal wire on the left side and a left side edge of an area, in which the first metal wire is in a first group of metal wires on the left side of the area in which the first group of metal wires are located. The second distance parameter is a distance S between two adjacent metal wires in each group of metal wires. The third distance parameter is a distance P between two first metal wires respectively on the first sides of two adjacent groups of metal wires. For example, the first side is the left side, the third distance is the distance P between two first metal wires respectively on the left sides of two adjacent groups of metal wires. The width parameter is a width W of each metal wire in each group of metal wires. Specifically, reference can be made to FIGS. 9*a*, 9*b* and 9*c*, Lmacro represents a length of the memory macro cell, Wmacro represents a width of the memory macro cell, and Wm2m represents a width of the second area.

The method for determining the metal wire arrangement parameter by the parameter determination unit 130 is described in detail below according to different areas.

(1) The step of determining the first metal wire arrangement parameter in the first area of the power domain to be processed according to the design requirement specifically includes:

the width parameter $W_1$ and the second distance parameter $S_1$ of each first area are determined according to the design requirement; the second distance parameter $S_1$ is greater than the minimum value of the width parameter $W_1$;

according to the first preset regulation, the first distance parameter $O_1$ of each first area is determined according to the width parameter $W_1$ and the first preset adjustment parameter factor $k_1$ of each first area; the first preset regulation can specifically satisfy $O_1=W_1/2+k_1$;

according to the second preset regulation, the third distance parameter $P_1$ of each first area is determined according to the width parameter $W_1$ and the second distance parameter $S_1$ of each first area; the second preset regulation can specifically satisfy $P_1=i(W_1+S_1)$; $W_1$ is the width parameter of each first area, $S_1$ is the second distance parameter of each first area, $P_1$ is the third distance parameter of each first area, and i is the number of metal wires in each group.

(2) The step of determining the corresponding second metal wire arrangement parameter in each second area according to the coordinate of each second area specifically includes:

the width parameter $W_2$ of each second area is determined according to the design requirement;

according to the third preset regulation, the first distance parameter $O_2$ of each second area is determined according to the width parameter $W_2$; the third preset regulation can specifically satisfy $O_2=W_2/2$;

according to the coordinate of each second area, the second distance parameter $S_2$ and the third distance parameter $P_2$ of each second area are respectively determined by using the following formula:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

$W_2$ is the width parameter of each second area, $S_2$ is the second distance parameter of each second area, $P_2$ is the third distance parameter of each second area, i is the number of metal wires in each group; $(X_{n+1})$ is the abscissa of the second or fourth vertex coordinate of each second area; $(X_n+W_{Mn})$ is the abscissa of the first or third vertex coordinate of each second area; n is the serial number of the memory macro cell.

(3) The step of determining the corresponding third metal wire arrangement parameter in each third area according to the coordinate of each third area specifically includes:

the width parameter $W_3$ of each third area is determined according to the design requirement;

according to the fourth preset regulation, the first distance parameter $O_3$ of each third area is determined according to the width parameter $W_3$ and the third preset adjustment parameter factor $k_3$; the fourth preset regulation can specifically satisfy $O_3=W_3/2+k_3$;

according to the coordinate of each third area, the corresponding third metal wire arrangement parameter in each third area is determined by using the following formulas:

$$S_3=\{\{(X_n+W_{Mn})-(X_n)\}-i*W_3\}/(i-1);$$

$$P_3=\{(X_n+W_{Mn})-(X_n)\}+S_3;$$

$W_3$ is the width parameter of each third area, $S_3$ is the second distance parameter of each third area, $P_3$ is the third distance parameter of each third area, i is the number of metal wires in each group, $(X_n+W_{Mn})$ is the abscissa of the second or fourth vertex coordinate of each third area, $X_n$ is the abscissa of the first or third vertex coordinate of each third area; n is the serial number of the memory macro cell.

The network arrangement unit 140 respectively performs the power supply network arrangement on the first area, each second area and each third area in the power domain to be processed according to the determined first metal wire arrangement parameter, second metal wire arrangement parameter, and third metal wire arrangement parameter. Specifically, after the first metal wire arrangement parameter corresponding to the first area, the second metal wire arrangement parameter corresponding to the each second area, and the third metal wire arrangement parameter corresponding to the each third area are determined, the power supply network arrangement is performed on the first area, each second area, and each third area in the power domain to be processed according to the respective corresponding metal wire arrangement parameter.

The present disclosure further provides a storage medium corresponding to the power supply network design method, on which a computer program is stored, and when the program is executed by a processor, the steps of any of the foregoing methods are implemented.

Accordingly, in the solution provided by the present disclosure, for the multi-power domain design of the chip, the partition of the power supply network area is completed by identifying the coordinate of each memory macro cell and processing the coordinate. After the partition of the area is completed, the metal wire arrangement parameter is determined by using the information of the coordinate of the area, and then a power supply network that meets the requirements is generated according to the coordinate and the metal wire arrangement parameter of each area. In the disclosure, a related algorithm is employed to replace the implementation of the partial traditional power supply network, and the basic power supply network implementation can be completed only by a simple configuration. The preset disclosure can realize the automatic design of the power supply network, improve a work efficiency, shorten a design cycle, have a high accuracy and a simple structure, and is suitable for the power supply network designs of all chips, and especially ensures the stability of chip power supply under a highly complex design.

The functions described herein may be implemented in hardware, software executed by a processor, firmware, or any combination thereof. If implemented in software executed by a processor, the functions can be stored as one or more instructions or codes on a computer-readable medium or transmitted via the computer-readable medium. Other examples and embodiments are within the scope and spirit of the disclosure and the appended claims. For example, due to the nature of software, the functions described above can be implemented using software executed by a processor, hardware, firmware, hardwired, or a combination of any of these. In addition, each function unit can be integrated into one processing unit, or each unit physically exists separately, or two or more units are integrated into one unit.

In the several embodiments provided in the disclosure, it should be understood that the disclosed technical content can be implemented in other ways. The device embodiments described above are merely illustrative. For example, the partition of the units can be a logical function partition, and there may be other partition modes in actual implementation, for example, multiple units or components may be combined or integrated into another system, or some features can be ignored or not implemented. In addition, the displayed or discussed mutual coupling or direct coupling or communication connection can be indirect coupling or communication connection through some interfaces, units or modules, and may be in electrical or other forms.

The units described as separate components may be or may not be physically separated, and the components used as the control device may be or may not be physical units, that is, they can be located in one place, or can be distributed on multiple units. Some or all of the units can be selected according to actual requirements to achieve the objective of the solution of the embodiments.

If the integrated unit is implemented in the form of a software functional unit and sold or used as an independent product, it can be stored in a computer readable storage medium. Based on this understanding, the technical solution of the present application essentially or the part that contributes to the existing technology or all or part of the technical solution can be embodied in the form of a software product, and the computer software product is stored in a storage medium, including several instructions to make a computer device (which may be a personal computer, a server, or a network device, etc.) execute all or part of the steps of the method described in each embodiment of the present disclosure. The aforementioned storage medium includes: a U disk, a Read-Only memory (ROM), a Random Access Memory (RAM), a mobile hard disk, a magnetic disk or an optical disk and other media that can store program codes.

The foregoing descriptions are merely embodiments of the present disclosure, and are not intended to limit the disclosure. For those skilled in the art, the disclosure can have various modifications and variations. Any modification, equivalent replacement, improvement, etc., made within the spirit and principle of the present disclosure shall fall within the protection scope of the claims of the disclosure.

INDUSTRIAL APPLICABILITY

The solution provided by the embodiment of the present disclosure can be used for the multi-power domain design of the chip to reduce network configuration. In the embodiments of the present disclosure, the partition of the power supply network area is completed by identifying the coordinate of each memory macro cell and processing the coordinate; after the partition of the area is completed, the metal wire arrangement parameter is calculated by using the coordinate information of the area, and then a power supply network that meets the requirements is generated according to the coordinate and the metal wire arrangement parameter of each area. Only simple configuration is required to realize the automation of the power supply network design, which improves the work efficiency, shortens the design cycle, has a high accuracy and a simple structure, and is suitable for power network designs of all chips.

What is claimed is:

1. A power supply network design method, comprising:
   identifying a coordinate of each memory macro cell in a power domain to be processed, the memory macro cell being rectangular, the coordinate comprising plane coordinates of four corners of the memory macro cell;
   determining a coordinate of a first area, a coordinate of each second area, and a coordinate of each third area in the power domain to be processed according to the coordinate of the each memory macro cell in the power domain to be processed, wherein the second area comprises an area between adjacent memory macro cells, the third area comprises an area of each independent memory macro cell, and the first area comprises an area excluding the first area and the second area;
   determining a first metal wire arrangement parameter in the first area in the power domain to be processed according to a design requirement determining a corresponding second metal wire arrangement parameter in each second area according to the coordinate of the each second area, and determining a corresponding third metal wire arrangement parameter in the each third area according to the coordinate of the each third area; and
   respectively performing a power supply network arrangement on the first area, the each second area, and the each third area of the power domain to be processed according to the determined first metal wire arrangement parameter, the determined second metal wire arrangement parameter, and the determined third metal wire arrangement parameter.

2. The method according to claim 1, wherein, the determining the coordinate of each second area in the power domain to be processed according to the coordinate of each memory macro cell in the power domain to be processed comprises:
   serving every two memory macro cells with consecutive serial numbers and a second area therebetween among various memory macro cells as an analysis unit according to a serial number of each memory macro cell in the power domain to be processed; and
   determining a coordinate of the second area between the two memory macro cells with the consecutive serial numbers according to coordinates of the two memory macro cells with the consecutive serial numbers in each analysis unit.

3. The method according to claim 2, wherein, the determining the coordinate of the second area between the two memory macro cells with the consecutive serial numbers according to the coordinates of the two memory macro cells with the consecutive serial numbers in each analysis unit comprises:
   serving a right upper vertex coordinate and a right lower vertex coordinate of a memory macro cell of a former serial number in the two memory macro cells with the consecutive serial numbers in each analysis unit respectively as a left upper vertex coordinate and a left lower vertex coordinate of the second area between the two memory macro cells with the consecutive serial numbers;
   serving a left upper vertex coordinate and a left lower vertex coordinate of a memory macro cell of a later serial number in the two memory macro cells with the consecutive serial numbers in each analysis unit respectively as a right upper vertex coordinate and a right lower vertex coordinate of the second area between the two memory macro cells with the consecutive serial numbers;
   serving a second vertex coordinate and a fourth vertex coordinate of the memory macro cell of the former serial number in the two memory macro cells with the consecutive serial numbers in each analysis unit respectively as a first vertex coordinate and a third vertex coordinate of the second area between the two memory macro cells with the consecutive serial numbers; and
   serving a first vertex coordinate and a third vertex coordinate of the memory macro cell of the later serial number in the two memory macro cells with the consecutive serial numbers in each analysis unit respectively as a second vertex coordinate and a fourth vertex coordinate of the second area between the two memory macro cells with the consecutive serial numbers.

4. The method according to claim 2, further comprising:
before determining the coordinate of the second area between the two memory macro cells with the consecutive serial numbers according to the coordinates of the two memory macro cells with the consecutive serial numbers in each analysis unit,
determining whether the second area exists between the two memory macro cells with the consecutive serial numbers in each analysis unit;
wherein the determining whether the second area exists between the two memory macro cells with the consecutive serial numbers in each analysis unit comprises:
determining whether a difference value between an abscissa of the first vertex coordinate/the third vertex coordinate of the memory macro cell of the later serial number in the two memory macro cells with the consecutive serial numbers and an abscissa of the second vertex coordinate or the fourth vertex coordinate of the memory macro cell of the former serial number in the two memory macro cells with the consecutive serial numbers is greater than zero; and
determining that the second area exists between the two memory macro cells with the consecutive serial numbers when the difference value between the abscissa of the first vertex coordinate/the third vertex coordinate of the memory macro cell of the later serial number in the two memory macro cells with the consecutive serial numbers and the abscissa of the second vertex coordinate or the fourth vertex coordinate of the memory macro cell of the former serial number in the two memory macro cells with the consecutive serial numbers is greater than zero.

5. The method according to claim 1, wherein, at least one of the first metal wire arrangement parameter, the second metal wire arrangement parameter, and the third metal wire arrangement parameter comprises:
a first distance parameter, configured to be a distance O between a middle position of a first metal wire on a first side and a first side edge of an area, wherein the first metal wire is in a first group of metal wires on the first side of the area;
a second distance parameter, configured to be a distance S between two adjacent metal wires in each group of metal wires;
a third distance parameter, configured to be a distance P between two first metal wires respectively on two first sides of two adjacent groups of metal wires;
a width parameter, configured to be a width W of each metal wire in each group of metal wires.

6. The method according to claim 5, wherein,
the determining the first metal wire arrangement parameter in the first area of the power domain to be processed according to the design requirement comprises:
determining a width parameter $W_1$ and a second distance parameter $S_1$ of each first area according to the design requirement;
in accordance with a first preset regulation, determining a first distance parameter $O_1$ of each first area according to the width parameter $W_1$ and a first preset adjustment parameter factor $k_1$ of each first area; and
in accordance with a second preset regulation, determining a third distance parameter $P_1$ of each first area according to the width parameter $W_1$ and the second distance parameter $S_1$ of each first area;
wherein the first preset regulation comprises $O_1 = W_1/2 + k_1$;
the second preset regulation comprises: $P_1 = i(W_1 - S_1)$;
wherein $W_1$ is the width parameter of each first area, $S_1$ is the second distance parameter of each first area, $P_1$ is the third distance parameter of each first area, and i is a number of metal wires in each group.

7. The method according to claim 5, wherein,
the determining the corresponding second metal wire arrangement parameter in each second area according to the coordinate of each second area comprises:
determining a width parameter $W_2$ of each second area according to the design requirement;
in accordance with a third preset regulation, determining a first distance parameter $O_2$ of each second area according to the width parameter $W_2$; wherein the third preset regulation comprises $O_2 = W_2/2$; and
determining the second distance parameter $S_2$ and the third distance parameter $P_2$ of each second area according to the coordinate of each second area by using following formulas:

$$S_2 = \{\{(X_{n+1}) - (X_n + W_{Mn})\} - i*W_2\}/(i-1);$$

$$P_2 = \{(X_{n+1}) - (X_n + W_{Mn})\} + S_2;$$

wherein $W_2$ is the width parameter of each second area, $S_2$ is the second distance parameter of each second area, $P_2$ is the third distance parameter of each second area, i is the number of metal wires in each group, $(X_{n+1})$ is an abscissa of a second or fourth vertex coordinate of each second area, $(X_n + W_{Mn})$ is an abscissa of a first or third vertex coordinate of each second area, n is the serial number of the memory macro cell.

8. The method according to claim 5, wherein,
the determining the corresponding third metal wire arrangement parameter in each third area according to the coordinate of each third area comprises:
determining a width parameter $W_3$ of each third area according to the design requirement;
in accordance with a fourth preset regulation, determining a first distance parameter $O_3$ of each third area according to the width parameter $W_3$ and a third preset adjustment parameter factor $k_3$;
wherein the fourth preset regulation comprises $O_3 = W_3/2 + k_3$; and
determining the corresponding third metal wire arrangement parameter in each third area according to the coordinate of each third area by using following formulas:

$$S_3 = \{\{(X_n + W_{Mn}) - (X_n)\} - i*W_3\}/(i-1);$$

$$P_3 = \{(X_n + W_{Mn}) - (X_n)\} + S_3;$$

wherein W3 is the width parameter of each third area, S3 is the second distance parameter of each third area, P3 is the third distance parameter of each third area, i is a number of metal wires in each group, (Xn+WMn) is an abscissa of a second or fourth vertex coordinate of each third area, Xn is an abscissa of a first or third vertex coordinate of each third area, n is the serial number of the memory macro cell.

9. The method according to claim 5, wherein,
the determining the first metal wire arrangement parameter in the first area of the power domain to be processed according to the design requirement comprises:

determining a width parameter $W_1$ and a second distance parameter $S_1$ of each first area according to the design requirement;

in accordance with a first preset regulation, determining a first distance parameter $O_1$ of each first area according to the width parameter $W_1$ and a first preset adjustment parameter factor $k_1$ of each first area; and in accordance with a second preset regulation, determining a third distance parameter $P_1$ of each first area according to the width parameter $W_1$ and the second distance parameter $S_1$ of each first area;

wherein the first preset regulation comprises $O_1=W_1/2+k_1$;

wherein the second preset regulation comprises $P_1=i(W_1+S_1)$; and wherein $W_1$ is the width parameter of each first area, $S_1$ is the second distance parameter of each first area, $P_1$ is the third distance parameter of each first area, and i is a number of metal wires in each group;

or, the determining the corresponding second metal wire arrangement parameter in each second area according to the coordinate of each second area comprises:

determining the width parameter $W_2$ of each second area according to the design requirement;

in accordance with a third preset regulation, determining a first distance parameter $O_2$ of each second area according to the width parameter $W_2$, wherein the third preset regulation comprises $O_2=W_2/2$; and determining the second distance parameter $S_2$ and the third distance parameter $P_2$ of each second area according to the coordinate of each second area by using following formulas:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

wherein $W_2$ is the width parameter of each second area, $S_2$ is the second distance parameter of each second area, $P_2$ is the third distance parameter of each second area, i is the number of metal wires in each group, $(X_{n+1})$ is an abscissa of a second or fourth vertex coordinate of each second area, $(X_n+W_{Mn})$ is an abscissa of a first or third vertex coordinate of each second area, n is the serial number of the memory macro cell;

or, the determining the corresponding third metal wire arrangement parameter in each third area according to the coordinate of each third area comprises:

determining a width parameter $W_3$ of each third area according to the design requirement;

in accordance with a fourth preset regulation, determining a first distance parameter $O_3$ of each third area according to the width parameter $W_3$ and a third preset adjustment parameter factor $k_3$;

wherein the fourth preset regulation comprises $O_3=W_3/2+k_3$; and determining the corresponding third metal wire arrangement parameter in each third area according to the coordinate of each third area by using following formulas:

$$S_3=\{\{(X_n+W_{Mn})-(X_n)\}-i*W_3\}/(i-1);$$

$$P_3=\{(X_n+W_{Mn})-(X_n)\}+S_3;$$

wherein W3 is the width parameter of each third area, S3 is the second distance parameter of each third area, P3 is the third distance parameter of each third area, i is a number of metal wires in each group, (Xn+WMn) is an abscissa of a second or fourth vertex coordinate of each third area, Xn is an abscissa of a first or third vertex coordinate of each third area, n is the serial number of the memory macro cell.

10. The method according to claim 5, wherein, the determining the first metal wire arrangement parameter in the first area of the power domain to be processed according to the design requirement comprises:

determining a width parameter $W_1$ and a second distance parameter $S_1$ of each first area according to the design requirement;

in accordance with a first preset regulation, determining a first distance parameter $O_1$ of each first area according to the width parameter $W_1$ and a first preset adjustment parameter factor $k_1$ of each first area; and in accordance with a second preset regulation, determining a third distance parameter $P_1$ of each first area according to the width parameter $W_1$ and the second distance parameter $S_1$ of each first area;

wherein the first preset regulation comprises $O_1=W_1/2+k_1$;

wherein the second preset regulation comprises $P_1=i(W_1+S_1)$;

wherein $W_1$ is the width parameter of each first area, $S_1$ is the second distance parameter of each first area, $P_1$ is the third distance parameter of each first area, and i is a number of metal wires in each group;

and, the determining the corresponding second metal wire arrangement parameter in each second area according to the coordinate of each second area comprises:

determining a width parameter $W_2$ of each second area according to the design requirement;

in accordance with a third preset regulation, determining a first distance parameter $O_2$ of each second area according to the width parameter $W_2$, wherein the third preset regulation comprises $O_2=W_2/2$;

determining the second distance parameter $S_2$ and the third distance parameter $P_2$ of each second area according to the coordinate of each second area by using following formulas:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

wherein $W_2$ is the width parameter of each second area, $S_2$ is the second distance parameter of each second area, $P_2$ is the third distance parameter of each second area, i is a number of metal wires in each group, $(X_{n+1})$ is an abscissa of a second or fourth vertex coordinate of each second area, $(X_n+W_{Mn})$ is an abscissa of a first or third vertex coordinate of each second area, n is the serial number of the memory macro cell;

and, the determining the corresponding third metal wire arrangement parameter in each third area according to the coordinate of each third area comprises:

determining a width parameter $W_3$ of each third area according to the design requirement;

in accordance with a fourth preset regulation, determining a first distance parameter $O_3$ of each third area according to the width parameter $W_3$ and a third preset adjustment parameter factor $k_3$;

wherein the fourth preset regulation comprises $O_3=W_3/2+k_3$; and determining the corresponding third metal wire arrangement parameter in each third area according to the coordinate of each third area by using following formulas:

$$S_3=\{\{(X_n+W_{Mn})-(X_n)\}-i*W_3\}/(i-1);$$

$$P_3=\{(X_n+W_{Mn})-(X_n)\}+S_3;$$

wherein W3 is the width parameter of each third area, S3 is the second distance parameter of each third area, P3 is the third distance parameter of each third area, i is the number of metal wires in each group, (Xn+WMn) is an abscissa of a second or fourth vertex coordinate of each third area, Xn is an abscissa of a first or third vertex coordinate of each third area, n is the serial number of the memory macro cell.

11. A power supply network design apparatus, comprising:
a coordinate identification unit, configured to identify a coordinate of each memory macro cell in a power domain to be processed, the memory macro cell being rectangular, the coordinate comprising plane coordinates of four corners of the memory macro cell;
a coordinate determination unit, configured to determine a coordinate of a first area, a coordinate of each second area and a coordinate of each third area in the power domain to be processed according to the coordinate of each memory macro cell in the power domain to be processed, wherein the second area comprises an area between adjacent memory macro cells, the third area comprises an area of each independent memory macro cell, and the first area comprises an area excluding the first area and the second area;
a parameter determination unit, configured to determine a first metal wire arrangement parameter in the first area in the power domain to be processed according to a design requirement, determine a corresponding second metal wire arrangement parameter in each second area according to the coordinate of each second area, and determine a corresponding third metal wire arrangement parameter in each third area according to the coordinate of each third area; and
a network arrangement unit, configured to perform a power supply network arrangement respectively on the first area, each second area and each third area in the power domain to be processed according to the determined first metal wire arrangement parameter, the determined second metal wire arrangement parameter, and the determined third metal wire arrangement parameter.

12. The apparatus according to claim 11, wherein, the determining, by the coordinate determination unit, the coordinate of each second area in the power domain to be processed according to the coordinate of each memory macro cell in the power domain to be processed comprises:
serving every two memory macro cells with consecutive serial numbers and a second area therebetween among various memory macro cells as an analysis unit according to a serial number of each memory macro cell in the power domain to be processed; and
determining the coordinate of the second area between the two memory macro cells with the consecutive serial numbers according to coordinates of the two memory macro cells with the consecutive serial numbers in each analysis unit;
wherein, the determining, by the coordinate determination unit, the coordinate of the second area between the two memory macro cells with the consecutive serial numbers according to the coordinates of the two memory macro cells with the consecutive serial numbers in each analysis unit comprises:
serving a second vertex coordinate and a fourth vertex coordinate of a memory macro cell of a former serial number in the two memory macro cells with the consecutive serial numbers in each analysis unit respectively as a first vertex coordinate and a third vertex coordinate of the second area between the two memory macro cells with the consecutive serial numbers; and
serving a first vertex coordinate and a third vertex coordinate of a memory macro cell of a later serial number in the two memory macro cells with the consecutive serial numbers in each analysis unit respectively as a second vertex coordinate and a fourth vertex coordinate of the second area between the two memory macro cells with the consecutive serial numbers.

13. The apparatus according to claim 12, wherein, the coordinate determination unit is further configured to:
determine whether the second area exists between the two memory macro cells with the consecutive serial numbers in each analysis unit before determining the coordinate of the second area between the two memory macro cells with the consecutive serial numbers according to the coordinates of the two memory macro cells with the consecutive serial numbers in each analysis unit;
wherein, the determining, by the coordinate determination unit, whether the second area exists between the two memory macro cells with the consecutive serial numbers in each analysis unit comprises:
determining whether a difference value between an abscissa of the first vertex coordinate/the third vertex coordinate of the memory macro cell of the later serial number in the two memory macro cells with the consecutive serial numbers and an abscissa of the second vertex coordinate or the fourth vertex coordinate of the memory macro cell of the former serial number in the two memory macro cells with the consecutive serial numbers is greater than zero; and
determining that the second area exists between the two memory macro cells with the consecutive serial numbers when the difference value between the abscissa of the first vertex coordinate/the third vertex coordinate of the memory macro cell of the later serial number in the two memory macro cells with the consecutive serial numbers and the abscissa of the second vertex coordinate or the fourth vertex coordinate of the memory macro cell of the former serial number in the two memory macro cells with the consecutive serial numbers is greater than zero.

14. The apparatus according to claim 11, wherein, at least one of the first metal wire arrangement parameter, the second metal wire arrangement parameter, and the third metal wire arrangement parameter comprises:
a first distance parameter, configured to be a distance O between a middle position of a first metal wire on a first side and a first side edge of an area, wherein the first metal wire is in a first group of metal wires on the first side of the area;
a second distance parameter, configured to be a distance S between two adjacent metal wires in each group of metal wires;

a third distance parameter, configured to be a distance P between two first metal wires respectively on two first sides of two adjacent groups of metal wires; and a width parameter, configured to be a width W of each metal wire in each group of metal wires.

15. The apparatus according to claim 14, wherein, the determining, by the parameter determination unit, the first metal wire arrangement parameter in the first area in the power domain to be processed according to the design requirement comprises:

determining a width parameter $W_1$ and a second distance parameter $S_1$ of each first area according to the design requirement;

in accordance with a first preset regulation, determining a first distance parameter $O_1$ of each first area according to the width parameter $W_1$ and a first preset adjustment parameter factor $k_1$ of each first area; and in accordance with a second preset regulation, determining a third distance parameter $P_1$ of each first area according to the width parameter $W_1$ and the second distance parameter $S_1$ of each first area;

wherein the first preset regulation comprises $O_1=W_2/2+k_1$;

wherein the second preset regulation comprises: $P_1=i(W_1+S_1)$; and wherein $W_1$ is the width parameter of each first area, $S_1$ is the second distance parameter of each first area, $P_1$ is the third distance parameter of each first area, and i is a number of metal wires in each group.

16. The apparatus according to claim 14, wherein, the determining, by the parameter determination unit, the corresponding second metal wire arrangement parameter in each second area according to the coordinate of each second area comprises:

determining a width parameter $W_2$ of each second area according to the design requirement;

in accordance with a third preset regulation, determining a first distance parameter $O_2$ of each second area according to the width parameter $W_2$; wherein the third preset regulation comprises $O_2=W_2/2$; and determining the second distance parameter $S_2$ and the third distance parameter $P_2$ of each second area according to the coordinate of each second area by using following formulas:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

wherein $W_2$ is the width parameter of each second area, $S_2$ is the second distance parameter of each second area, $P_2$ is the third distance parameter of each second area, i is the number of metal wires in each group, $(X_{n+1})$ is an abscissa of a second or fourth vertex coordinate of each second area, $(X_n+W_{Mn})$ is an abscissa of a first or third vertex coordinate of each second area, n is the serial number of the memory macro cell.

17. The apparatus according to claim 14, wherein, the determining, by the parameter determination unit, the corresponding third metal wire arrangement parameter in each third area according to the coordinate of each third area comprises:

determining a width parameter $W_3$ of each third area according to the design requirement;

in accordance with a fourth preset regulation, determining a first distance parameter $O_3$ of each third area according to the width parameter $W_3$ and a third preset adjustment parameter factor $k_3$;

wherein the fourth preset regulation comprises $O_3=W_3/2+k_3$; and determining the corresponding third metal wire arrangement parameter in each third area according to the coordinate of each third area by using following formulas:

$$S_3=\{\{(X_n+W_{Mn})-(X_n)\}-i*W_3\}/(i-1);$$

$$P_3=\{(X_n+W_{Mn})-(X_n)\}+S_3;$$

wherein $W_3$ is the width parameter of each third area, $S_3$ is the second distance parameter of each third area, $P_3$ is the third distance parameter of each third area, i is a number of metal wires in each group, $(X_n+W_{Mn})$ is an abscissa of a second or fourth vertex coordinate of each third area, $X_n$ is an abscissa of a first or third vertex coordinate of each third area, n is the serial number of the memory macro cell.

18. The apparatus according to claim 14, wherein, the determining, by the parameter determination unit, the first metal wire arrangement parameter in the first area of the power domain to be processed according to the design requirement comprises:

determining a width parameter $W_1$ and a second distance parameter $S_1$ of each first area according to the design requirement;

in accordance with a first preset regulation, determining a first distance parameter $O_1$ of each first area according to the width parameter $W_1$ and a first preset adjustment parameter factor $k_1$ of each first area; and in accordance with a second preset regulation, determining a third distance parameter $P_1$ of each first area according to the width parameter $W_1$ and the second distance parameter $S_1$ of each first area;

wherein the first preset regulation comprises $O_1=W_1/2+k_1$;

wherein the second preset regulation comprises $P_1=i(W_1+S_1)$; and wherein $W_1$ is the width parameter of each first area, $S_1$ is the second distance parameter of each first area, $P_1$ is the third distance parameter of each first area, and i is a number of metal wires in each group;

or the determining, by the parameter determination unit, the corresponding second metal wire arrangement parameter in each second area according to the coordinate of each second area comprises:

determining the width parameter $W_2$ of each second area according to the design requirement;

in accordance with a third preset regulation, determining a first distance parameter $O_2$ of each second area according to the width parameter $W_2$, wherein the third preset regulation comprises $O_2=W_2/2$; and determining the second distance parameter $S_2$ and the third distance parameter $P_2$ of each second area according to the coordinate of each second area by using following formulas:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

wherein $W_2$ is the width parameter of each second area, $S_2$ is the second distance parameter of each second area, $P_2$ is the third distance parameter of each second area, i is the number of metal wires in each group, $(X_{n+1})$ is an abscissa of a second or fourth vertex coordinate of each second area, $(X_n+W_{Mn})$ is an abscissa of a first or third vertex coordinate of each second area, n is the serial number of the memory macro cell;

or, the determining, by the parameter determination unit, the corresponding third metal wire arrangement parameter in each third area according to the coordinate of each third area comprises:

determining a width parameter $W_3$ of each third area according to the design requirement;

in accordance with a fourth preset regulation, determining a first distance parameter $O_3$ of each third area according to the width parameter $W_3$ and a third preset adjustment parameter factor $k_3$;

wherein the fourth preset regulation comprises $O_3=W_3/2+k_3$; and determining the corresponding third metal wire arrangement parameter in each third area according to the coordinate of each third area by using following formulas:

$$S_3=\{\{(X_n+W_{Mn})-(X_n)\}-i*W_3\}/(i-1);$$

$$P_3=\{(X_n+W_{Mn})-(X_n)\}+S_3;$$

wherein $W_3$ is the width parameter of each third area, $S_3$ is the second distance parameter of each third area, $P_3$ is the third distance parameter of each third area, i is a number of metal wires in each group, $(X_n+W_{Mn})$ is an abscissa of a second or fourth vertex coordinate of each third area, $X_n$ is an abscissa of a first or third vertex coordinate of each third area, n is the serial number of the memory macro cell.

19. The apparatus according to claim 14, wherein, the determining, by the parameter determination unit, the first metal wire arrangement parameter in the first area of the power domain to be processed according to the design requirement comprises:

determining a width parameter $W_1$ and a second distance parameter $S_1$ of each first area according to the design requirement;

in accordance with a first preset regulation, determining a first distance parameter $O_1$ of each first area according to the width parameter $W_1$ and a first preset adjustment parameter factor $k_1$ of each first area;

in accordance with a second preset regulation, determining a third distance parameter $P_1$ of each first area according to the width parameter $W_1$ and the second distance parameter $S_1$ of each first area;

wherein the first preset regulation comprises $O_1=W_1/2+k_1$;

wherein the second preset regulation comprises $P_1=i(W_1+S_1)$;

wherein $W_1$ is the width parameter of each first area, $S_1$ is the second distance parameter of each first area, $P_1$ is the third distance parameter of each first area, and i is a number of metal wires in each group;

and, the determining, by the parameter determination unit, the corresponding second metal wire arrangement parameter in each second area according to the coordinate of each second area comprises:

determining a width parameter $W_2$ of each second area according to the design requirement;

in accordance with a third preset regulation, determining a first distance parameter $O_2$ of each second area according to the width parameter $W_2$, wherein the third preset regulation comprises $O_2=W_2/2$;

determining the second distance parameter $S_2$ and the third distance parameter $P_2$ of each second area according to the coordinate of each second area by using following formulas:

$$S_2=\{\{(X_{n+1})-(X_n+W_{Mn})\}-i*W_2\}/(i-1);$$

$$P_2=\{(X_{n+1})-(X_n+W_{Mn})\}+S_2;$$

wherein $W_2$ is the width parameter of each second area, $S_2$ is the second distance parameter of each second area, $P_2$ is the third distance parameter of each second area, i is a number of metal wires in each group, $(X_{n+1})$ is an abscissa of a second or fourth vertex coordinate of each second area, $(X_n+W_{Mn})$ is an abscissa of a first or third vertex coordinate of each second area, n is the serial number of the memory macro cell;

and, the determining, by the parameter determination unit, the corresponding third metal wire arrangement parameter in each third area according to the coordinate of each third area comprises:

determining a width parameter $W_3$ of each third area according to the design requirement;

in accordance with a fourth preset regulation, determining a first distance parameter $O_3$ of each third area according to the width parameter $W_3$ and a third preset adjustment parameter factor $k_3$;

wherein the fourth preset regulation comprises $O_3=W_3/2+k_3$; and determining the corresponding third metal wire arrangement parameter in each third area according to the coordinate of each third area by using following formulas:

$$S_3=\{\{(X_n+W_{Mn})-(X_n)\}-i*W_3\}/(i-1);$$

$$P_3=\{(X_n+W_{Mn})-(X_n)\}+S_3;$$

wherein $W_3$ is the width parameter of each third area, $S_3$ is the second distance parameter of each third area, $P_3$ is the third distance parameter of each third area, i is the number of metal wires in each group, $(X_n+W_{Mn})$ is an abscissa of a second or fourth vertex coordinate of each third area, $X_n$ is an abscissa of a first or third vertex coordinate of each third area, n is the serial number of the memory macro cell.

20. A non-transitory computer-readable storage medium, on which a computer program is stored, wherein when the computer program is executed by a processor, the processor is caused to:

identify a coordinate of each memory macro cell in a power domain to be processed, the memory macro cell being rectangular, the coordinate comprising plane coordinates of four corners of the memory macro cell;

determine a coordinate of a first area, a coordinate of each second area, and a coordinate of each third area in the power domain to be processed according to the coordinate of the each memory macro cell in the power domain to be processed, wherein the second area comprises an area between adjacent memory macro cells, the third area comprises an area of each independent memory macro cell, and the first area comprises an area excluding the first area and the second area;

determine a first metal wire arrangement parameter in the first area in the power domain to be processed according to a design requirement, determine a corresponding second metal wire arrangement parameter in each second area according to the coordinate of the each second area, and determine a corresponding third metal wire arrangement parameter in the each third area according to the coordinate of the each third area; and respectively perform a power supply network arrangement on the first area, the each second area, and the each third area of the power domain to be processed according to the determined first metal wire arrangement parameter, the determined second metal wire arrangement parameter, and the determined third metal wire arrangement parameter.

* * * * *